Figure 1A:
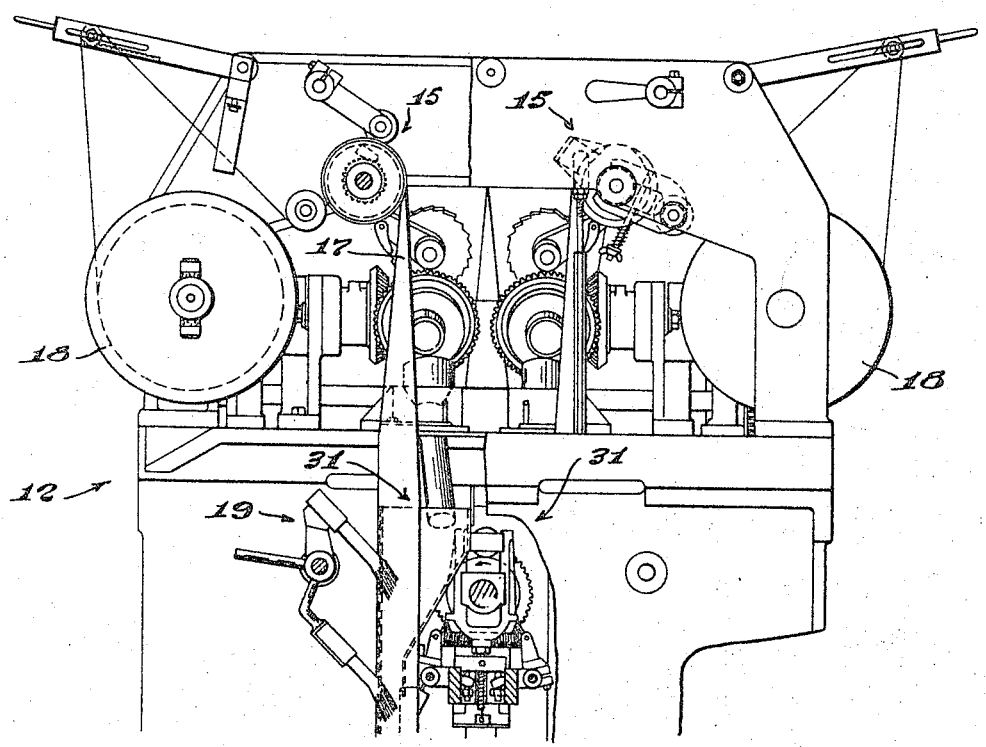

Dec. 28, 1948.   L. B. EATON ET AL   2,457,216
MEANS AND METHOD FOR PRODUCING INFUSION
BAGS WITH NONTANGLING HANDLES
Filed Dec. 11, 1945   22 Sheets-Sheet 1
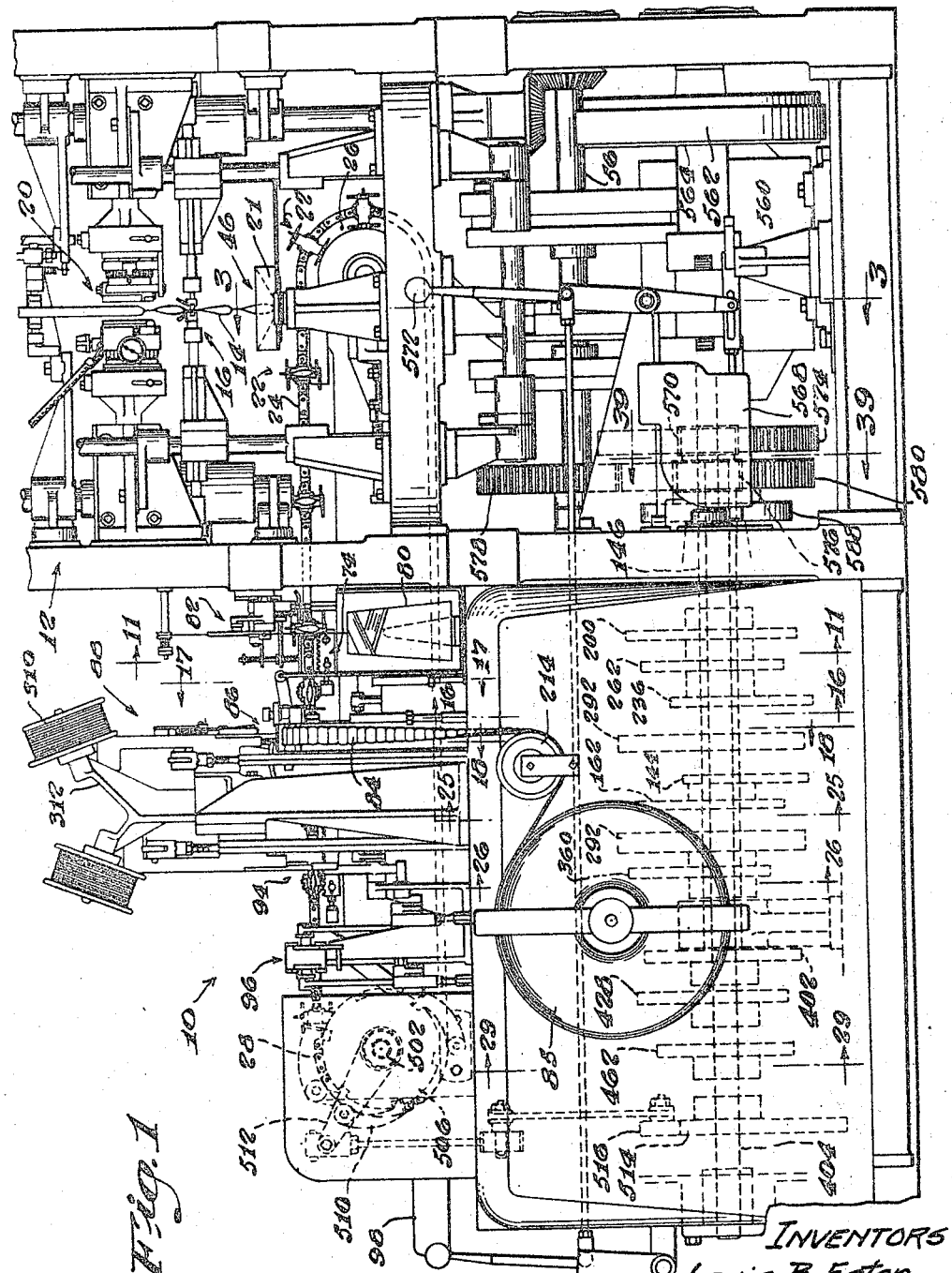
INVENTORS
Lewis B. Eaton
Robert William Vergobbi
BY J. Stanley Churchill
ATTORNEY INVENTORS
Lewis B. Eaton
Robert William Vergobbi By J. Stanley Churchill
ATTORNEY Dec. 28, 1948.  L. B. EATON ET AL  2,457,216
MEANS AND METHOD FOR PRODUCING INFUSION
BAGS WITH NONTANGLING HANDLES
Filed Dec. 11, 1945  22 Sheets-Sheet 5

INVENTORS
Lewis B. Eaton
Robert William Vergobbi
By J. Stanley Churchill
ATTORNEY

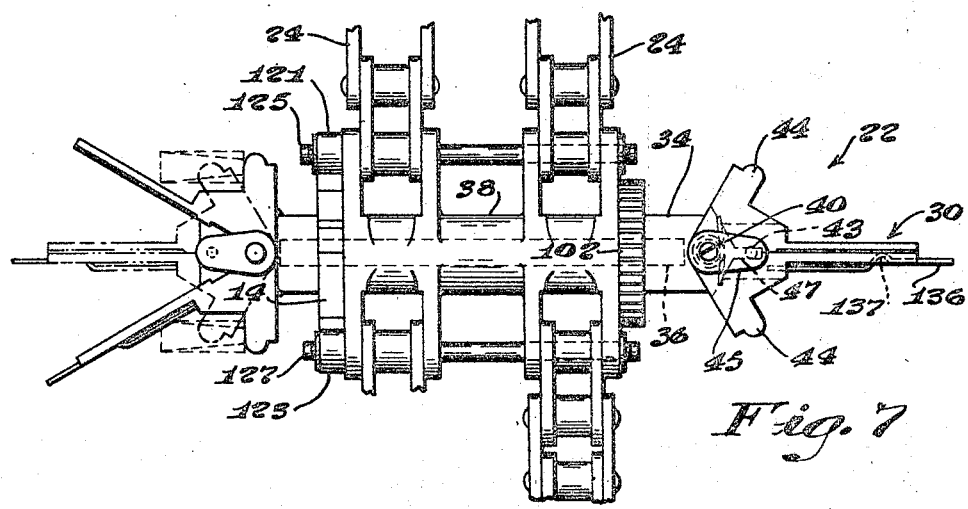
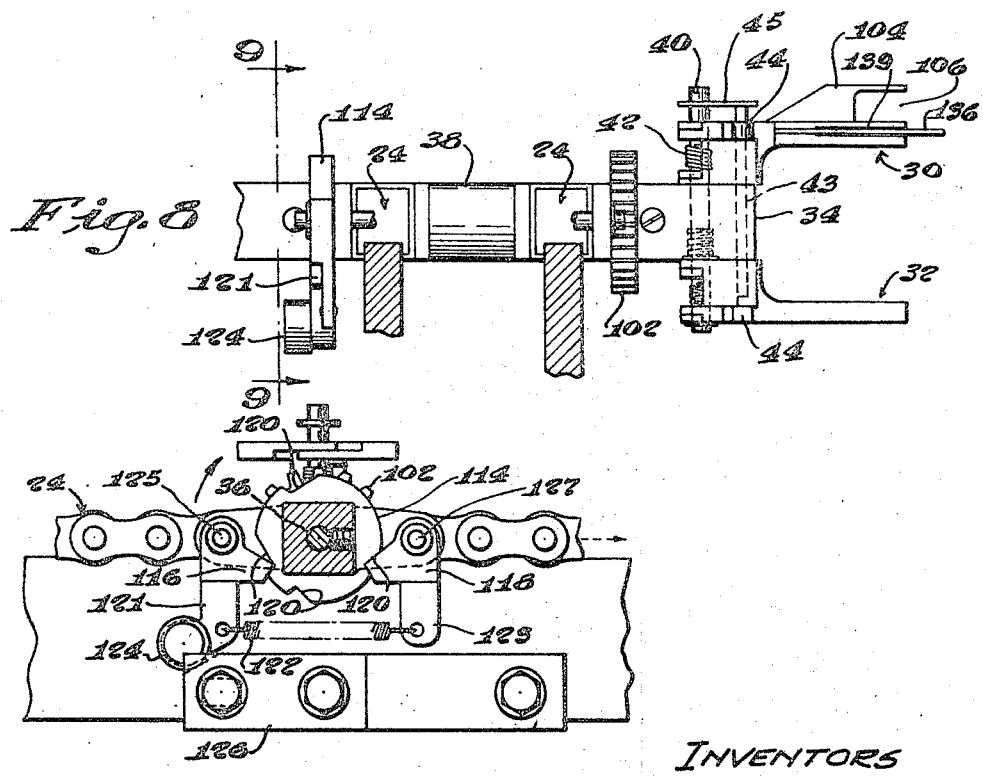

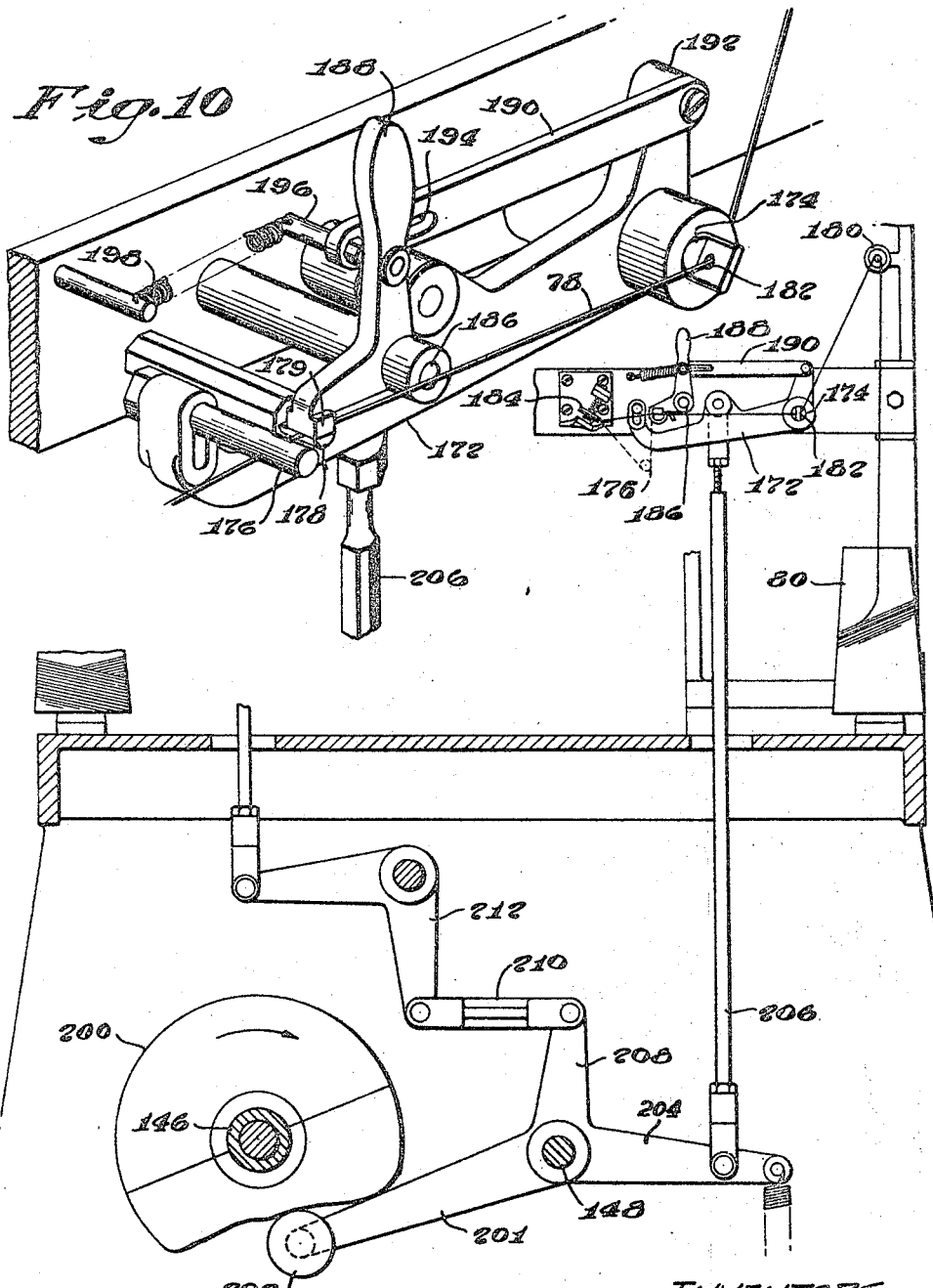

Dec. 28, 1948.　　　　L. B. EATON ET AL　　　　2,457,216
MEANS AND METHOD FOR PRODUCING INFUSION
BAGS WITH NONTANGLING HANDLES
Filed Dec. 11, 1945　　　　　　　　　　22 Sheets-Sheet 8
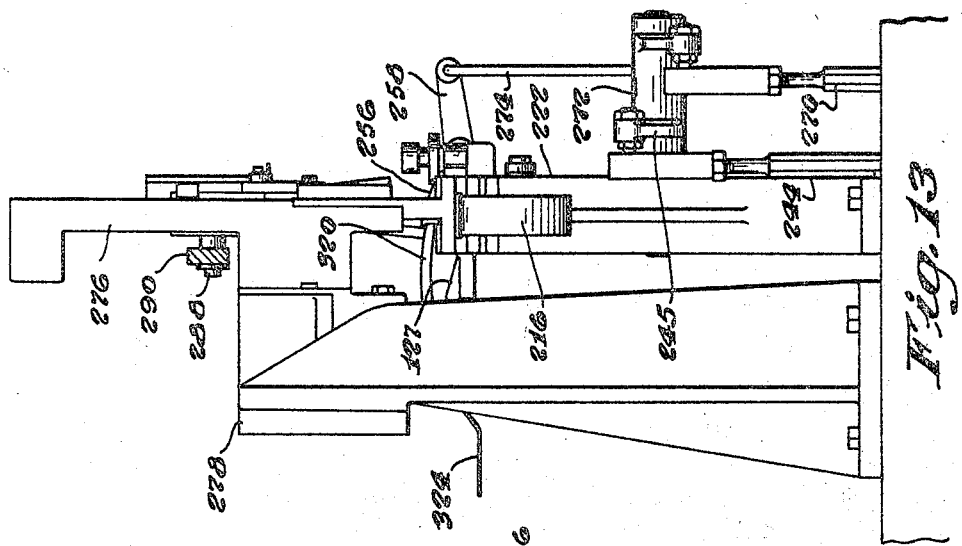
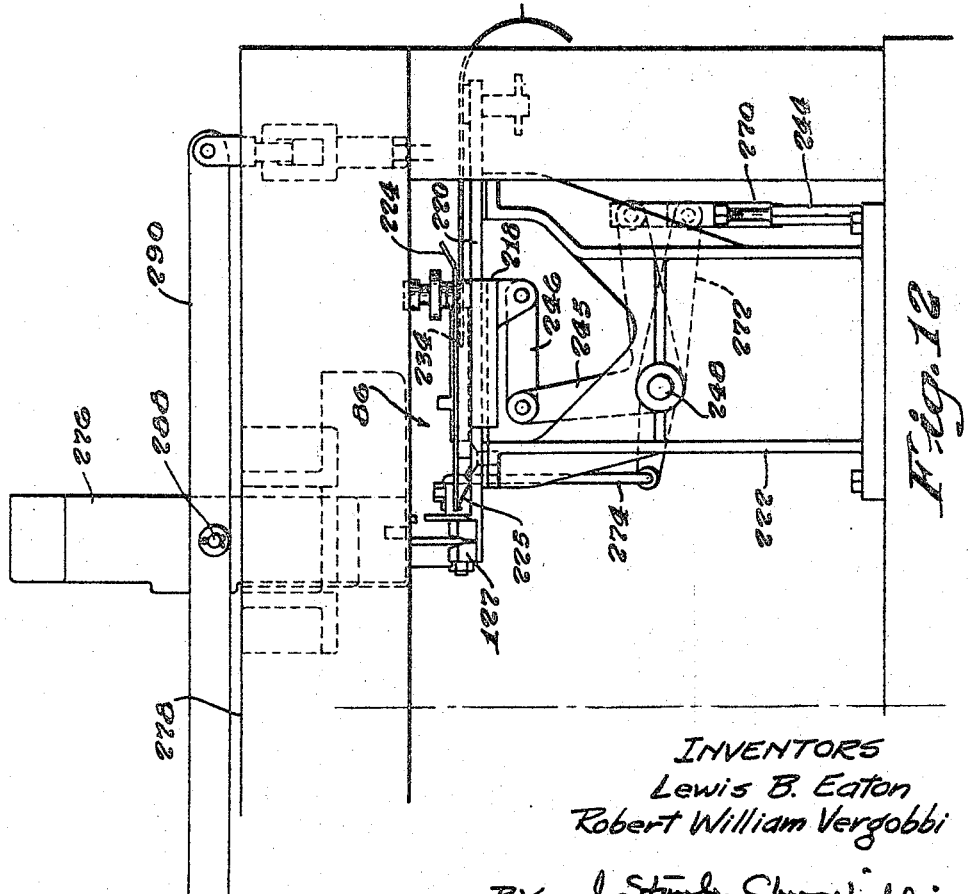
INVENTORS
Lewis B. Eaton
Robert William Vergobbi
BY J. Stanley Churchill
ATTORNEY

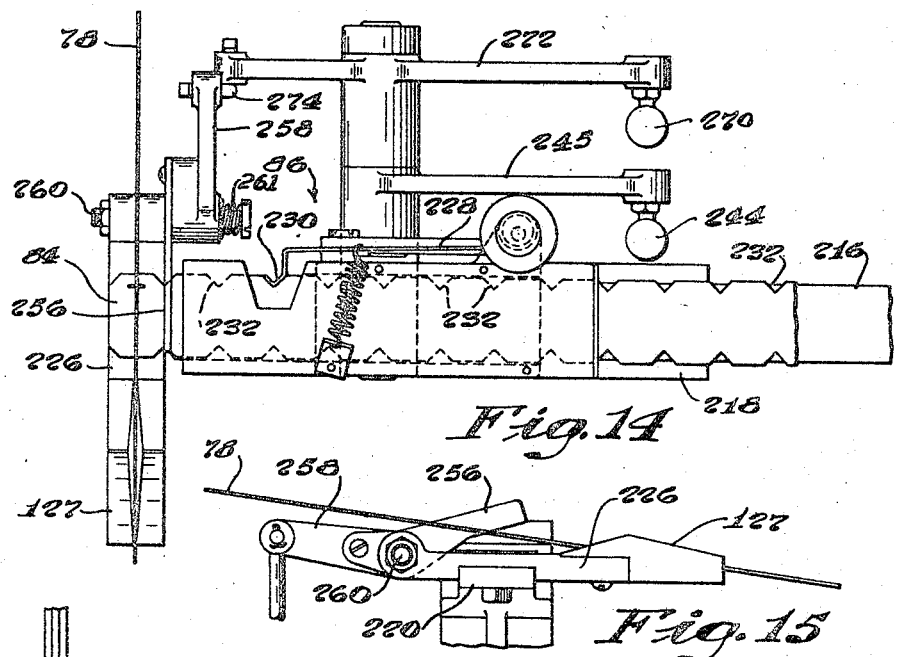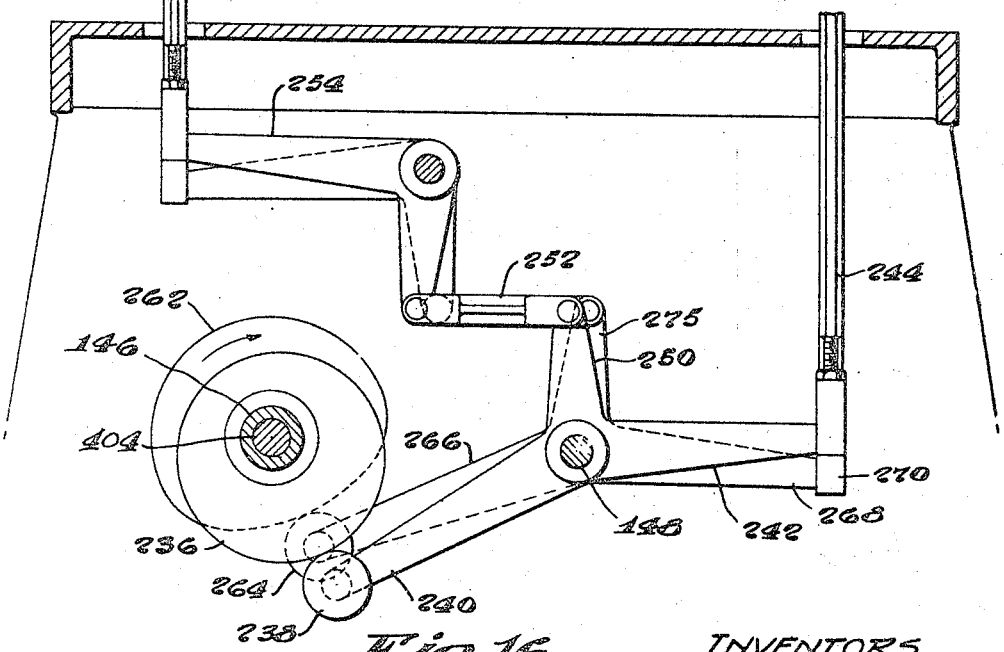

INVENTORS
Lewis B. Eaton
Robert William Vergobbi

By J. Stanley Churchill
ATTORNEY

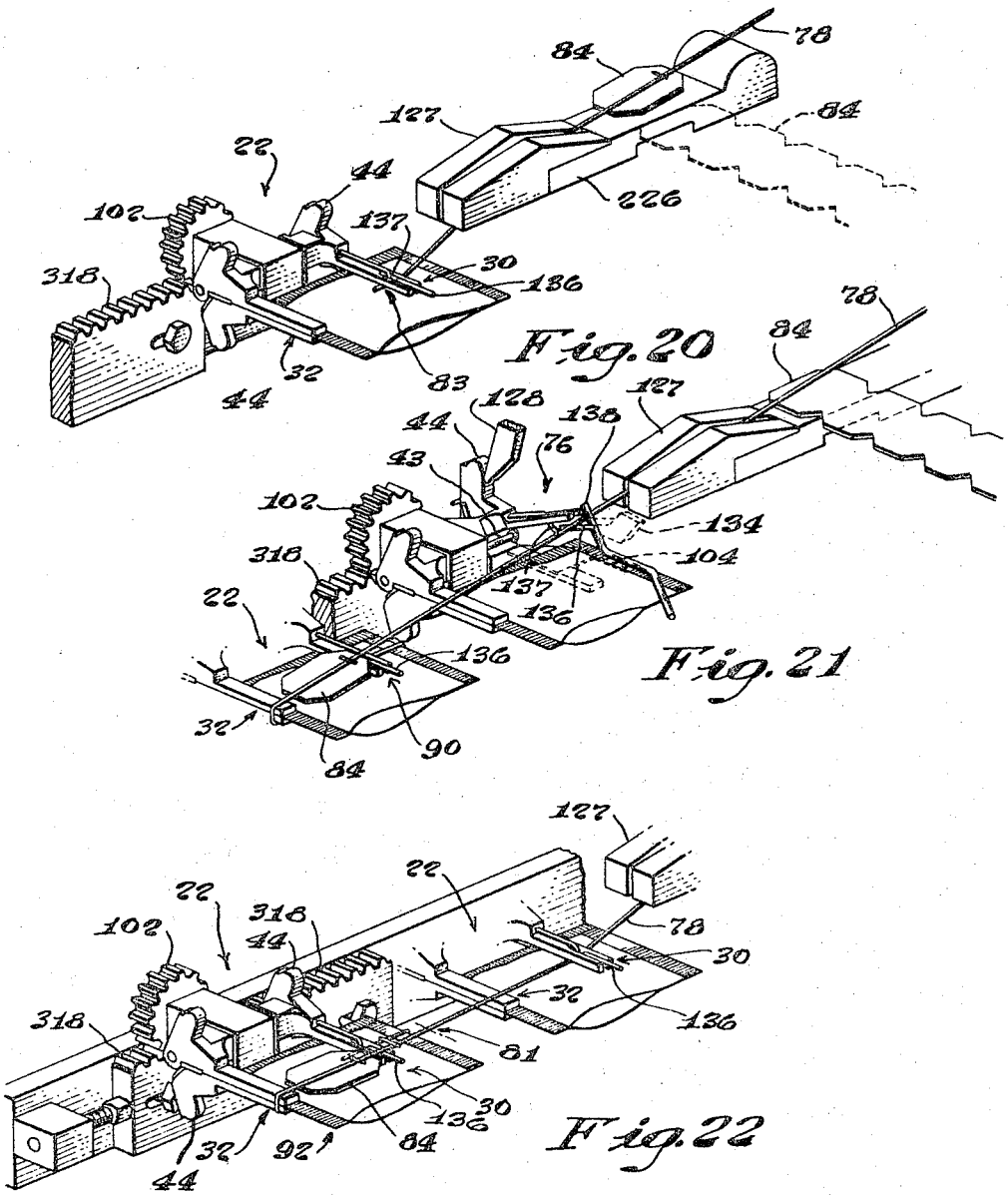

Dec. 28, 1948.  L. B. EATON ET AL  2,457,216
MEANS AND METHOD FOR PRODUCING INFUSION
BAGS WITH NONTANGLING HANDLES
Filed Dec. 11, 1945  22 Sheets-Sheet 13

INVENTORS
Lewis B. Eaton
Robert William Vergobbi

BY J. Stanley Churchill
ATTORNEY

INVENTORS
Lewis B. Eaton
Robert William Vergobbi

BY J. Stanley Churchill
ATTORNEY

Dec. 28, 1948.   L. B. EATON ET AL   2,457,216
MEANS AND METHOD FOR PRODUCING INFUSION
BAGS WITH NONTANGLING HANDLES
Filed Dec. 11, 1945   22 Sheets-Sheet 16

INVENTORS
Lewis B. Eaton
Robert William Vergobbi
BY J. Stanley Churchill
ATTORNEY

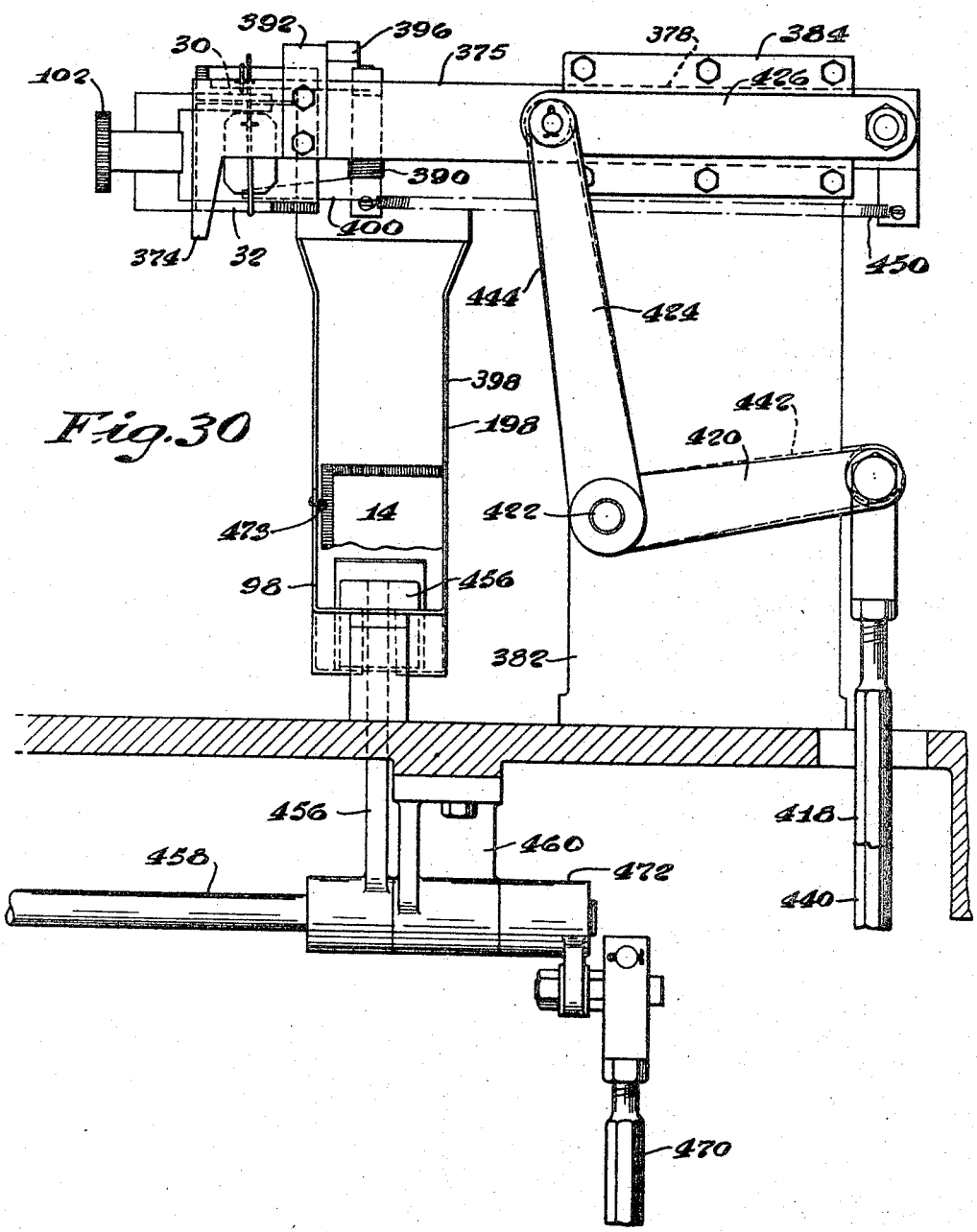
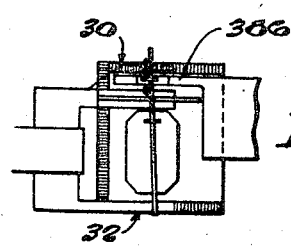

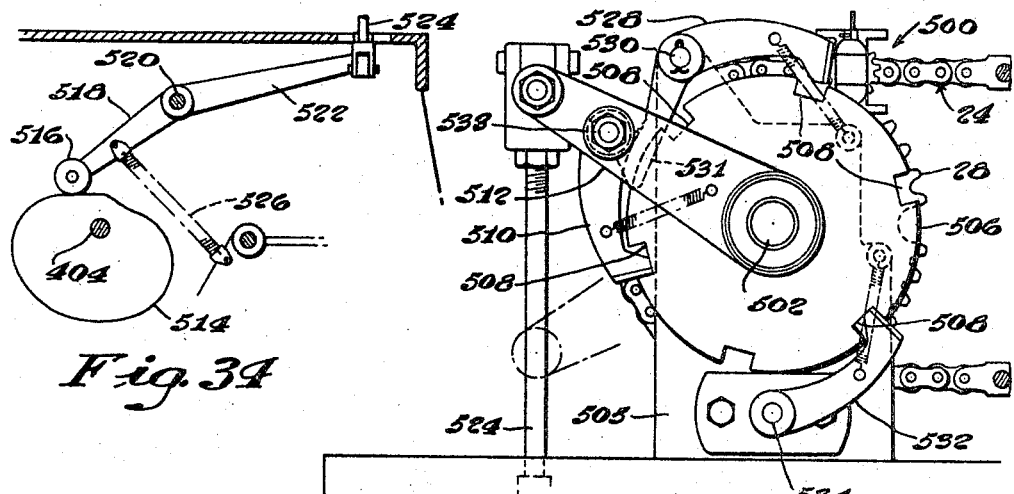
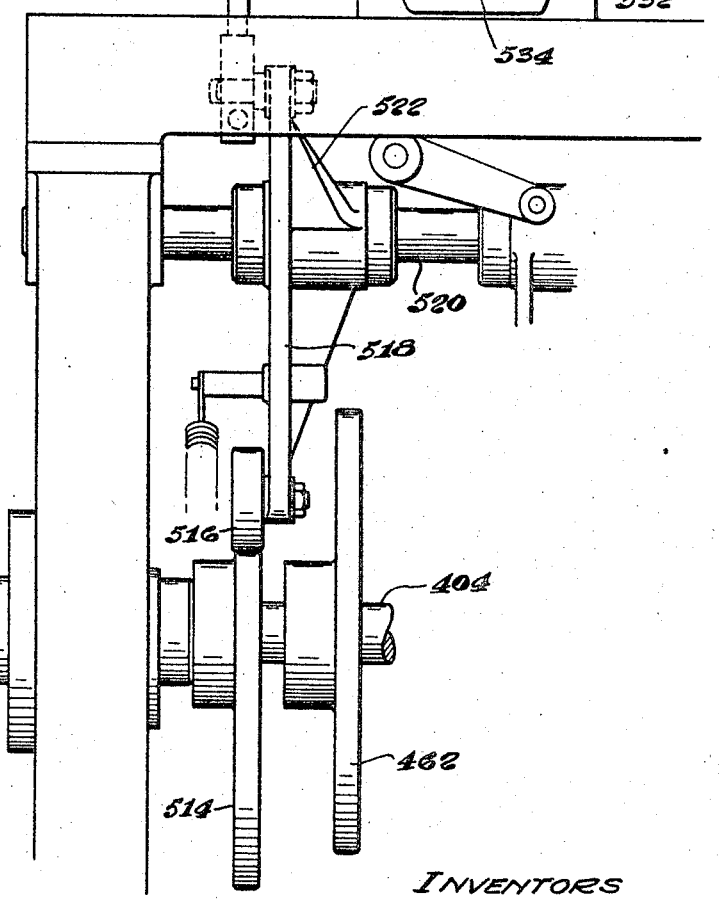

Dec. 28, 1948.　　　　L. B. EATON ET AL　　　　2,457,216
MEANS AND METHOD FOR PRODUCING INFUSION
BAGS WITH NONTANGLING HANDLES
Filed Dec. 11, 1945　　　　　　　　　　22 Sheets-Sheet 20

INVENTORS
Lewis B. Eaton
Robert William Vergobbi

BY J. Stanley Churchill
ATTORNEY

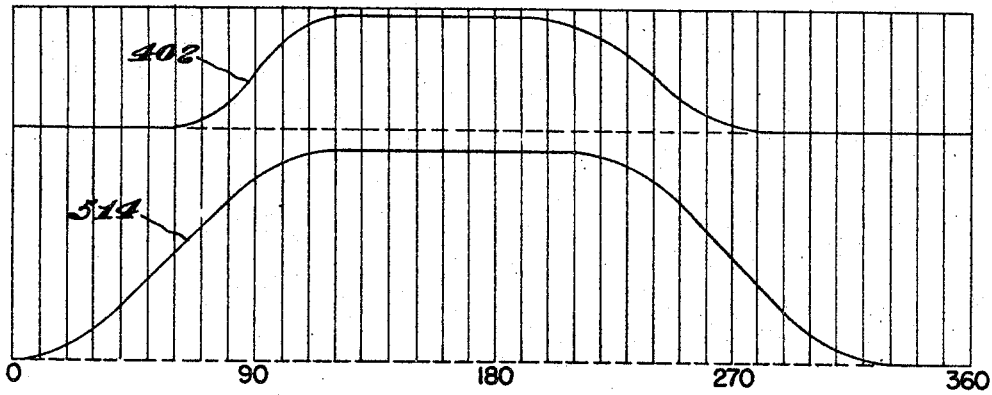
Fig. 38
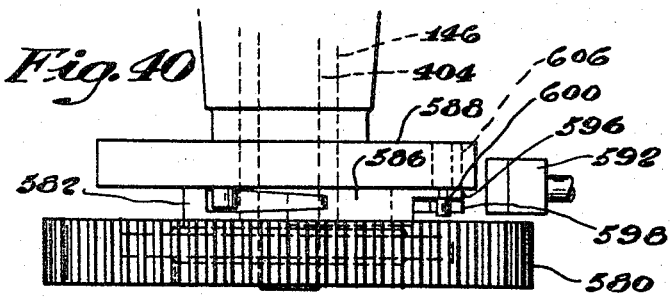
Fig. 40
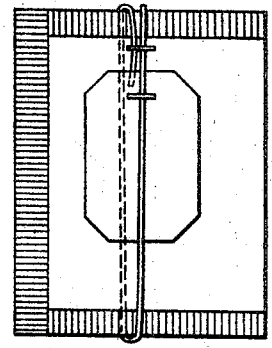
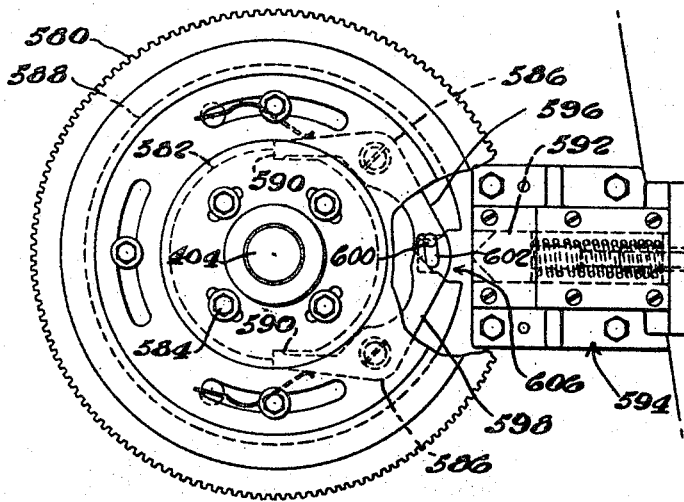
Fig. 39

Patented Dec. 28, 1948

2,457,216

UNITED STATES PATENT OFFICE 2,457,216

MEANS AND METHOD FOR PRODUCING INFUSION BAGS WITH NONTANGLING HANDLES

Lewis B. Eaton and Robert William Vergobbi, Quincy, Mass., assignors to Pneumatic Scale Corporation, Limited, Quincy, Mass., a corporation of Massachusetts Application December 11, 1945, Serial No. 634,358

27 Claims. (Cl. 93—3)

This invention relates to apparatus for producing bags, and particularly to infusion bags, and also to a method of and apparatus for attaching a tag to a filled and sealed bag.

The invention has for one of its objects to provide novel and improved apparatus for producing bags, and particularly infusion bags, having provision for attaching a handle comprising a tag and a length of twine, to the bag in a novel, economical and superior manner.

A further and more specific object of the invention is to provide novel and improved apparatus for producing bags, and particularly infusion bags, having provision for attaching a handle comprising a tag and a length of twine to a bag in a novel and efficient manner such as to detachably secure the normally extended handle in proximity to the bag whereby to produce a tagged bag offering minimum liability of entanglement with other bags when a relatively large number of such bags are packed in a container.

A still further object of the invention is to provide a novel method of and apparatus for attaching a handle comprising a tag and a length of twine to a bag in a novel and efficient manner such as to produce a tagged bag offering minimum liability of entanglement with other bags when a substantial number thereof are packed in a container.

With these objects in view and such others as may hereinafter appear, the invention consists in the novel method of and apparatus for attaching a tag to a bag, in the bag making apparatus, and in the various structures, arrangements and combinations of parts hereinafter described and particularly defined in the claims at the end of this specification.

Figure 2:
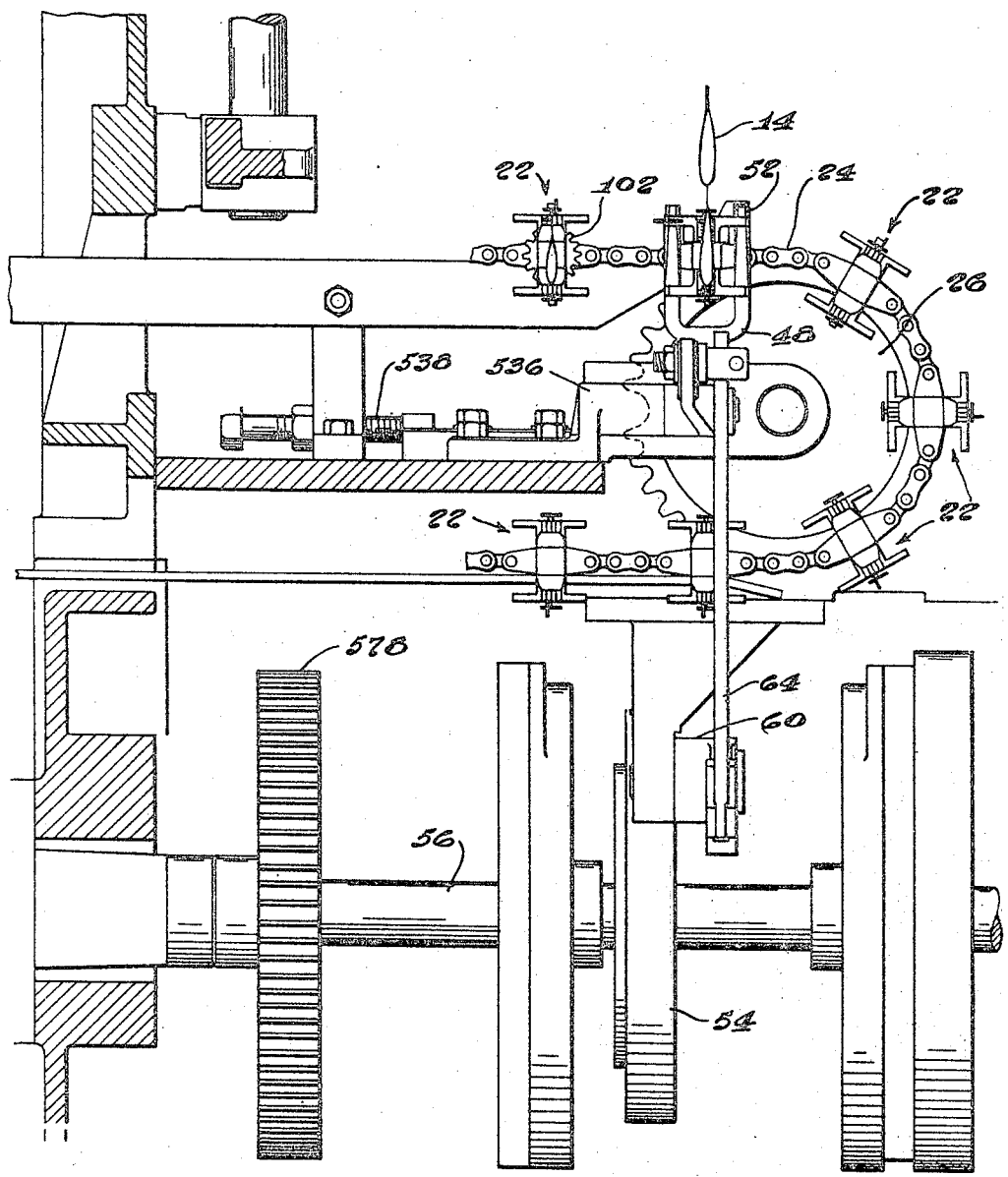
Figure 3:
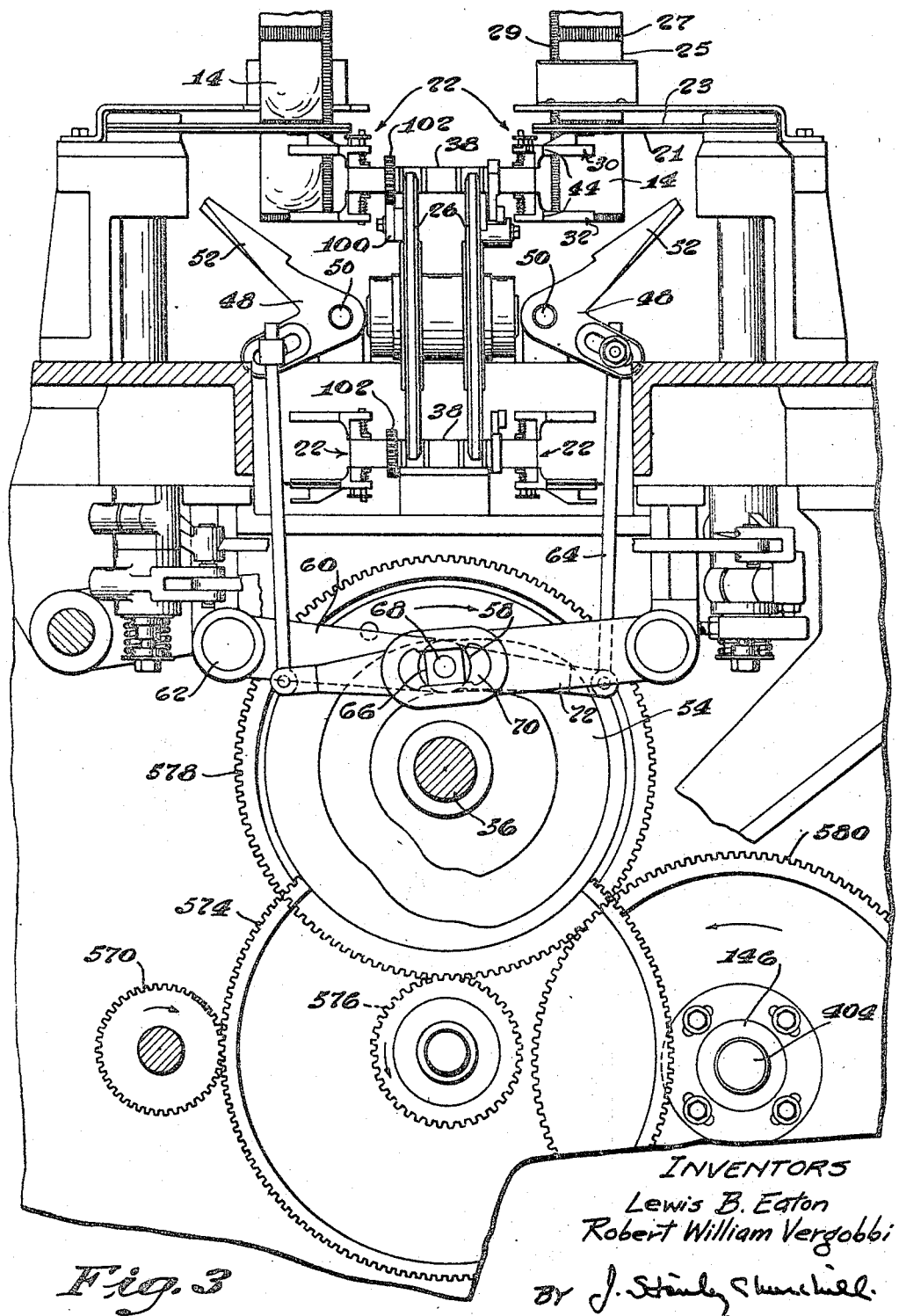
Figures 4, 5:
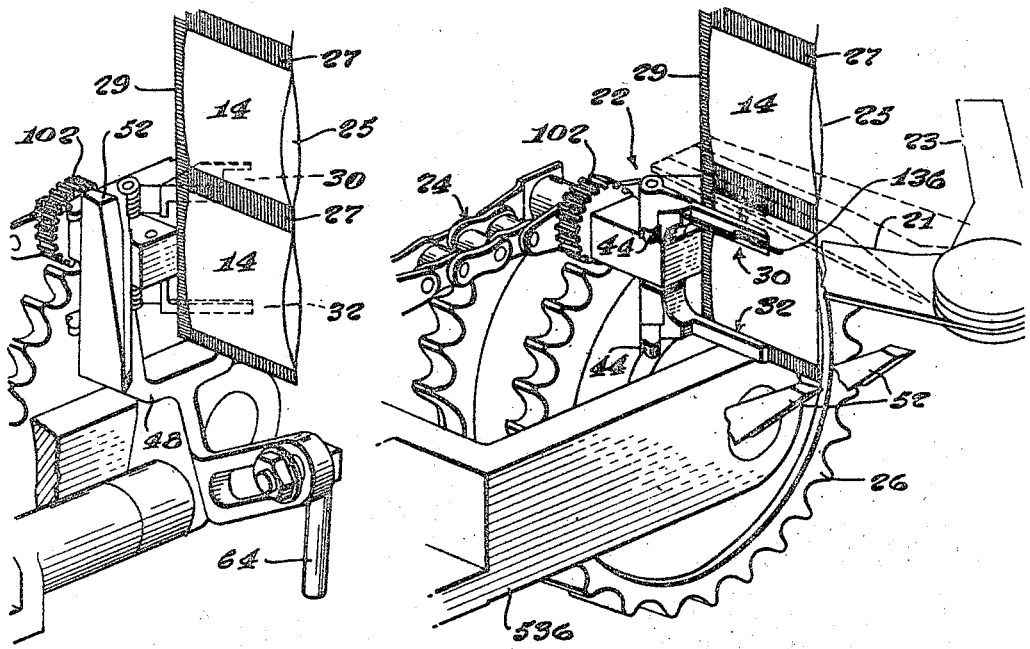
Figure 6:
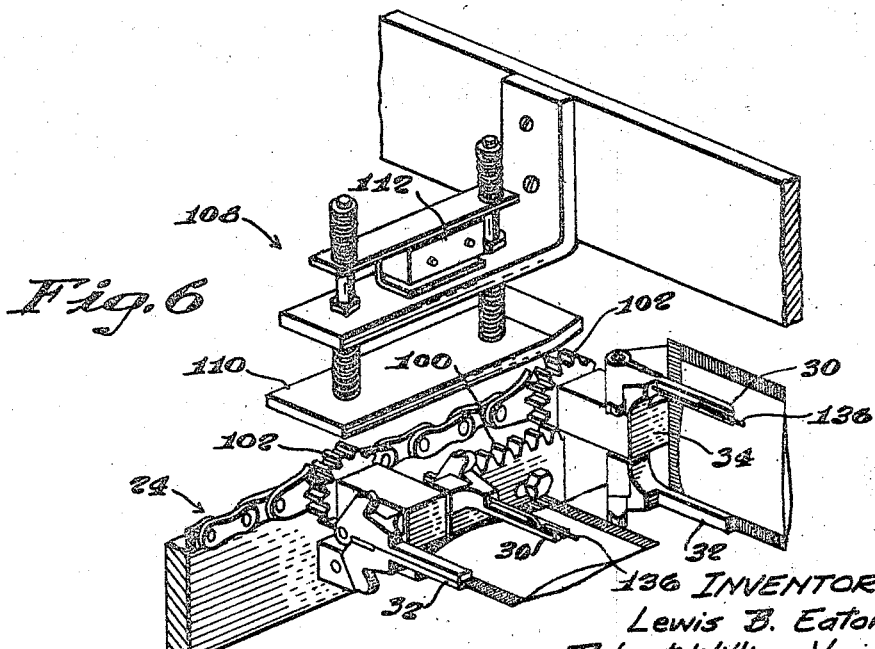
Figure 17:
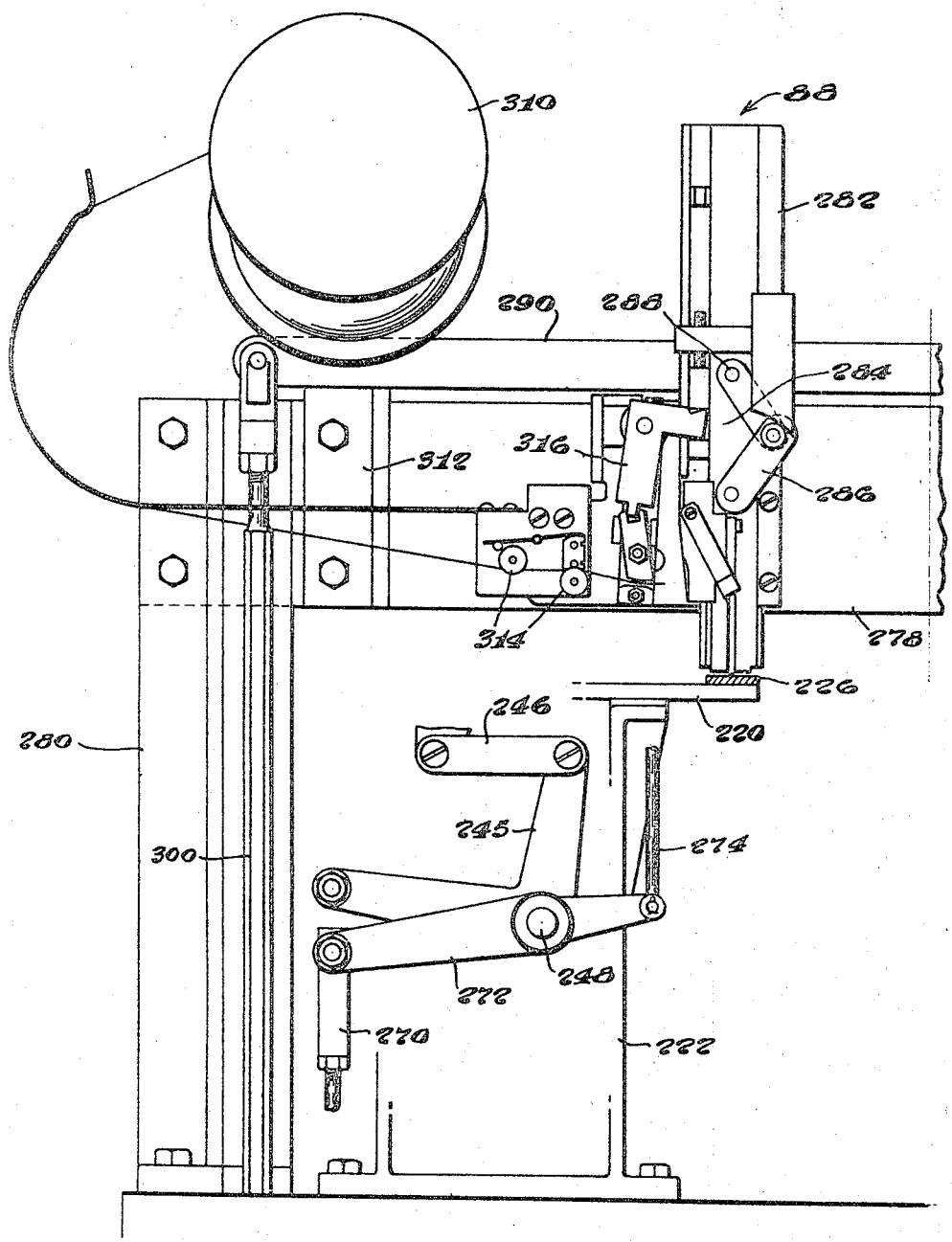
Figure 18:
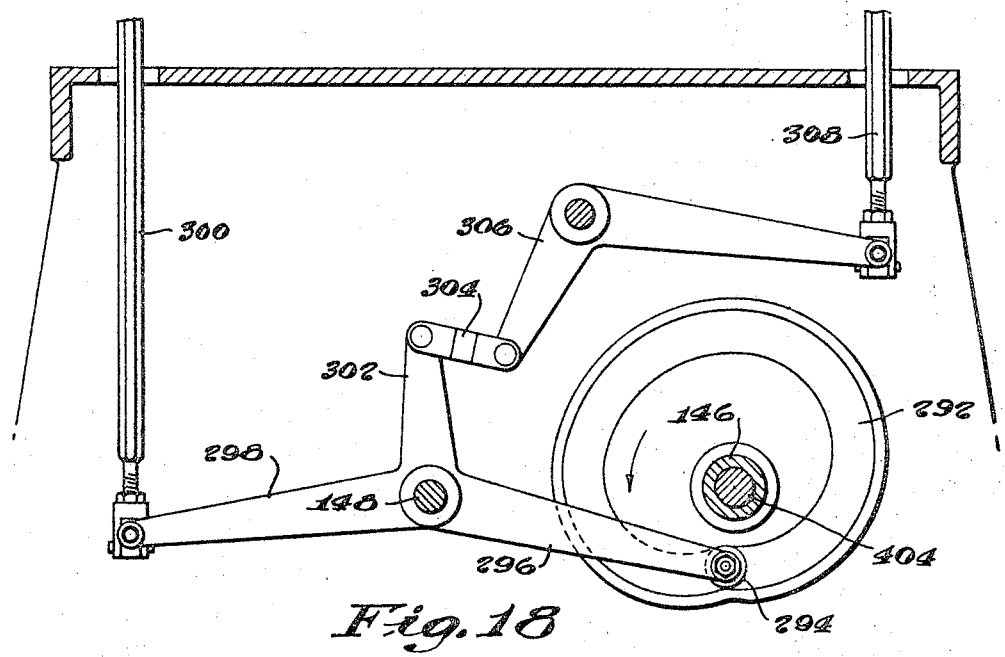
Figure 19:
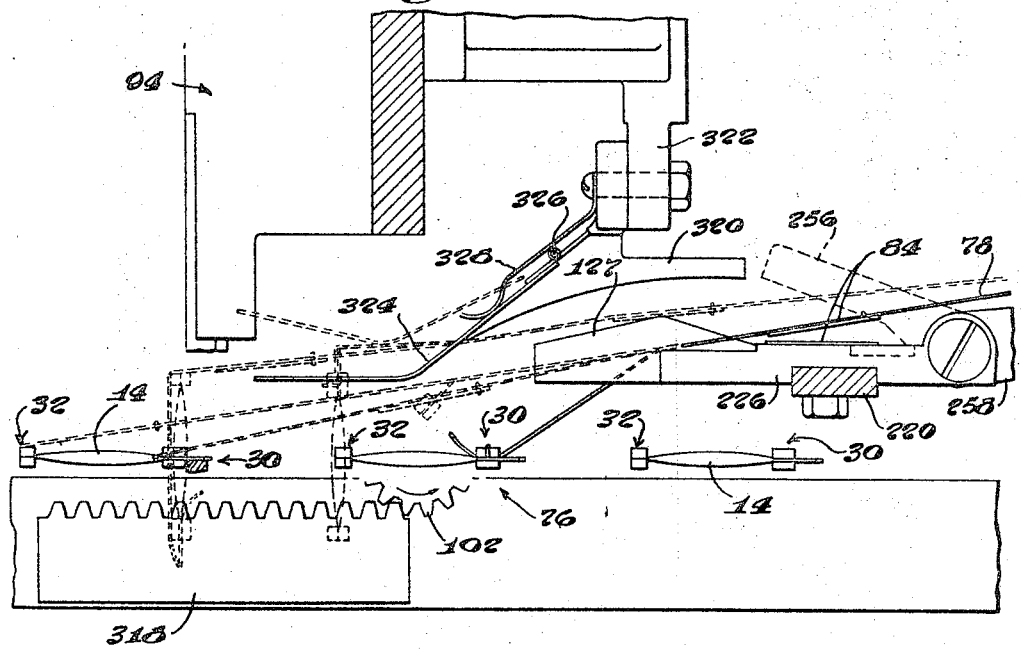
Figure 23:
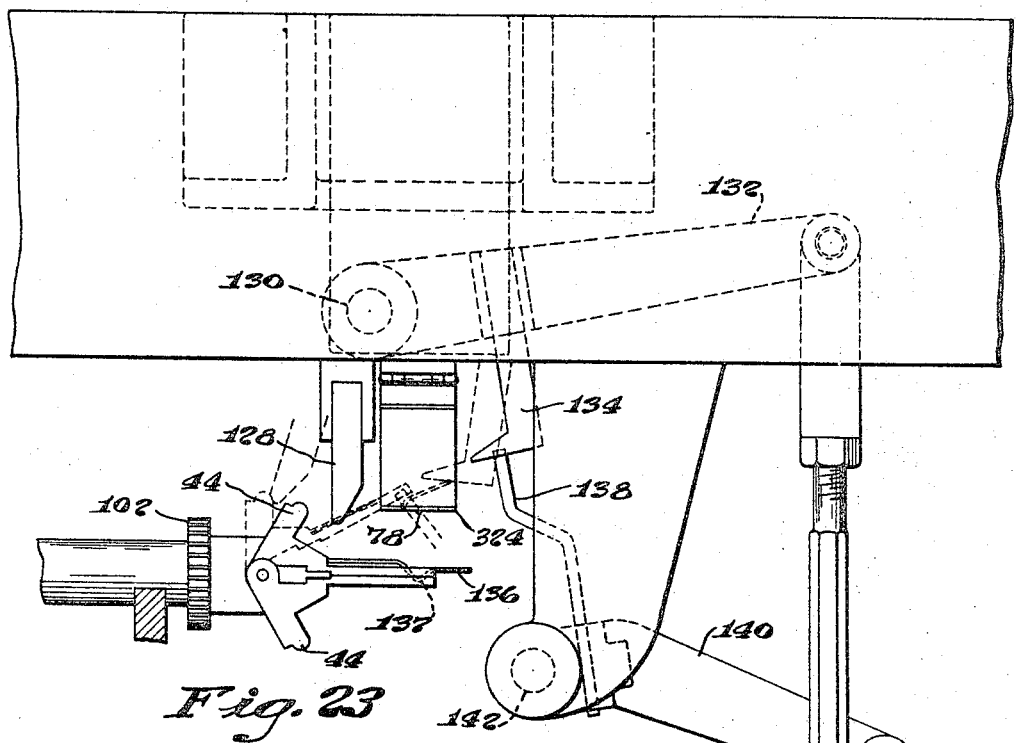
Figure 24:
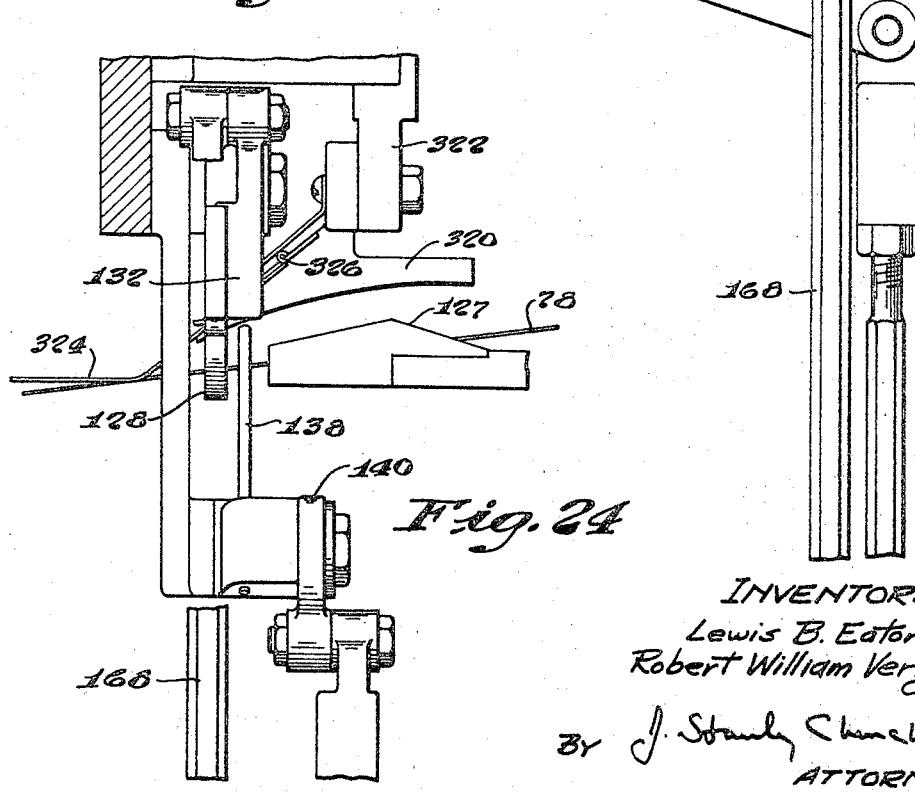
Figure 25:
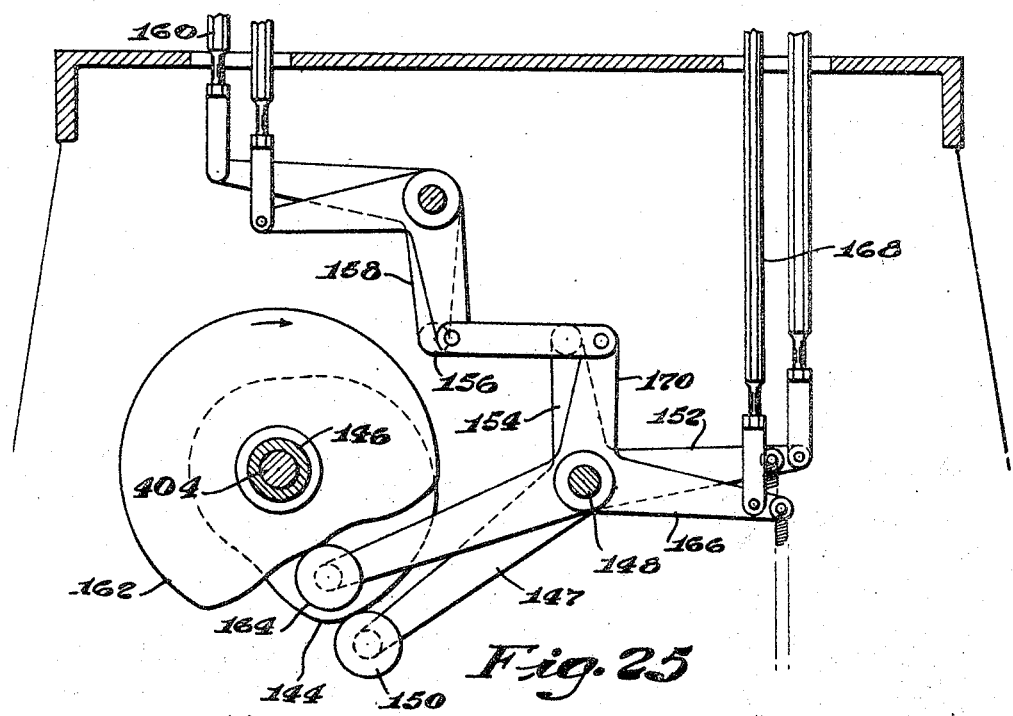
Figure 26:
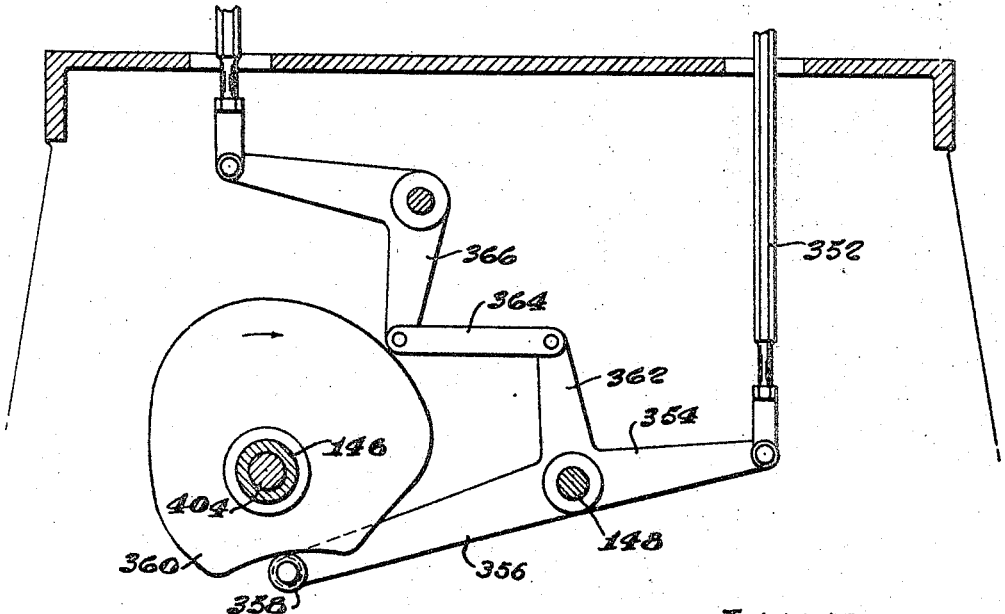
Figure 27:
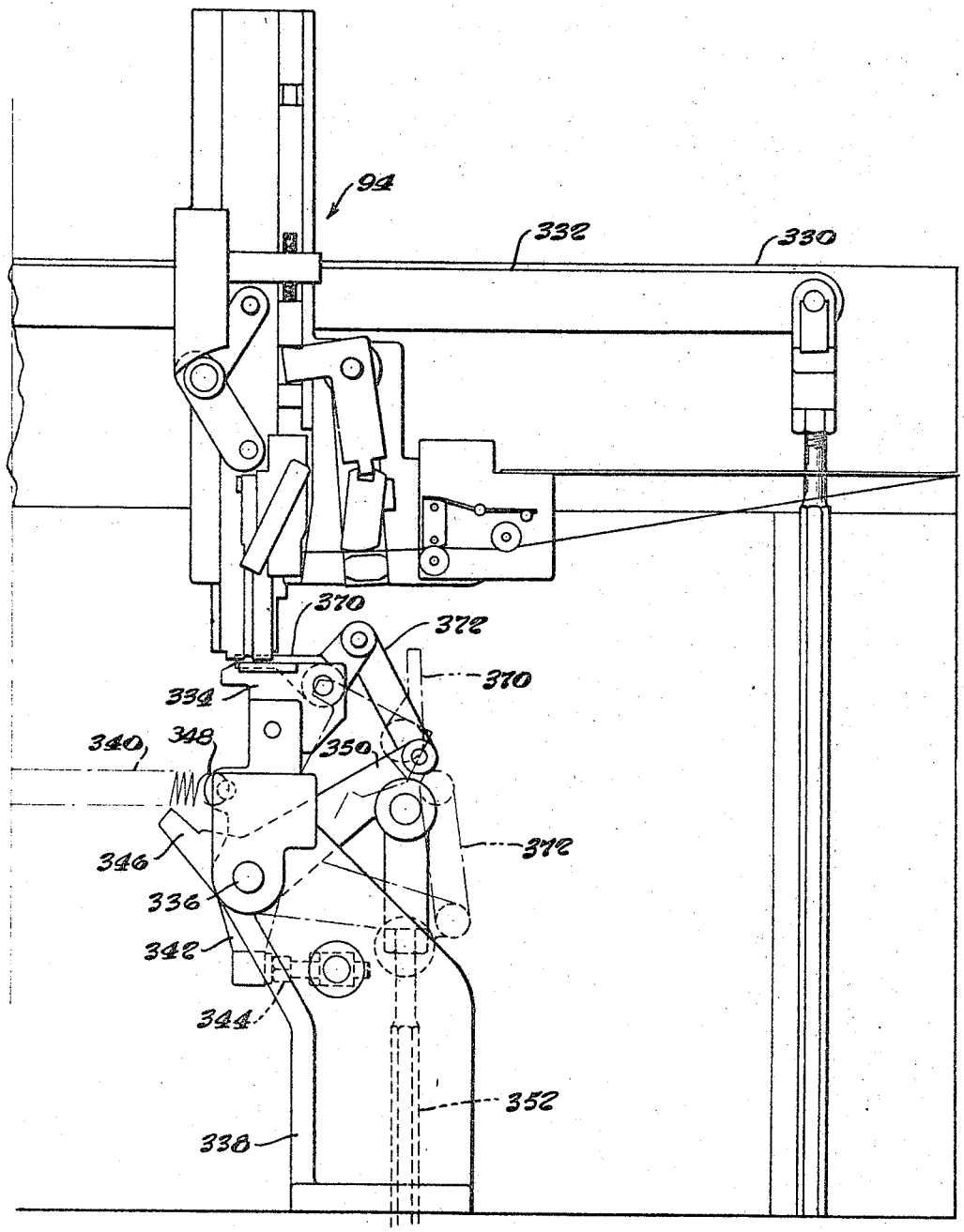
Figure 28:
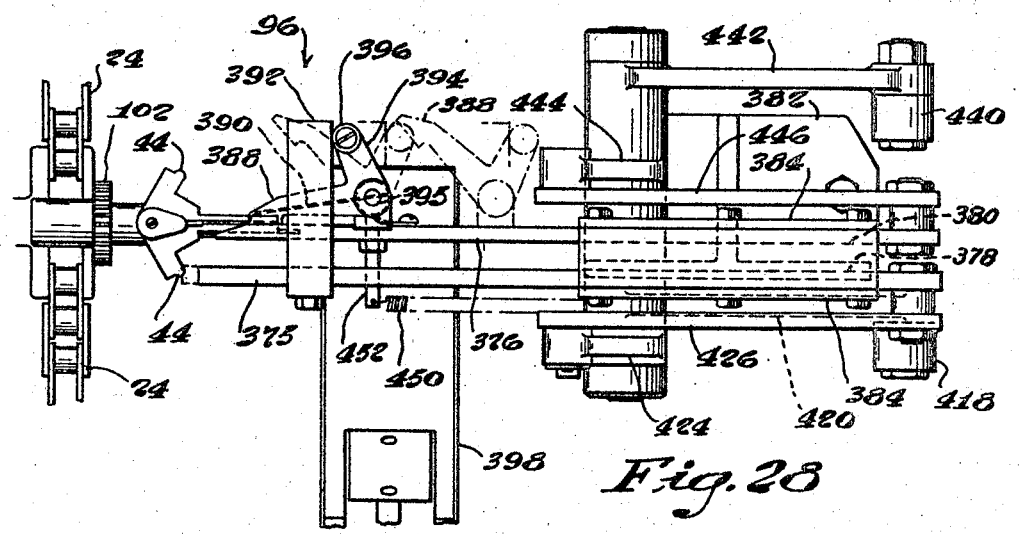
Figure 29:
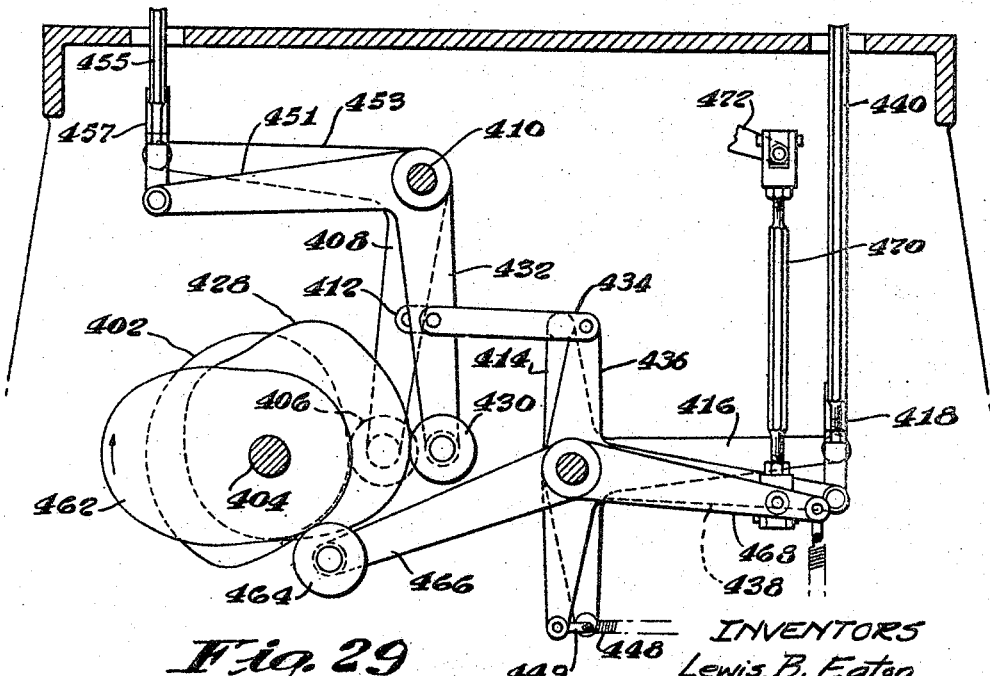
Figure 32:
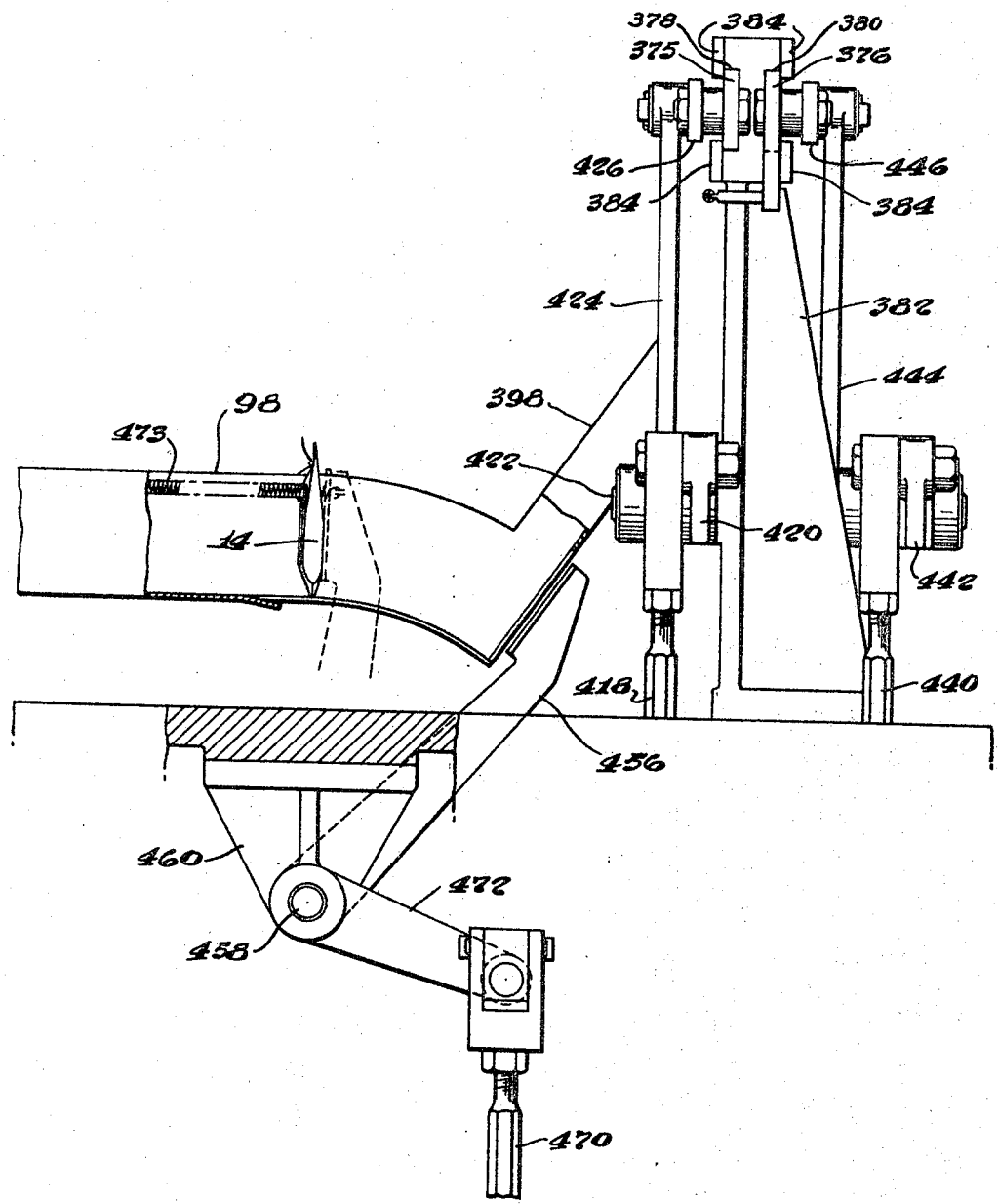
Figure 35:
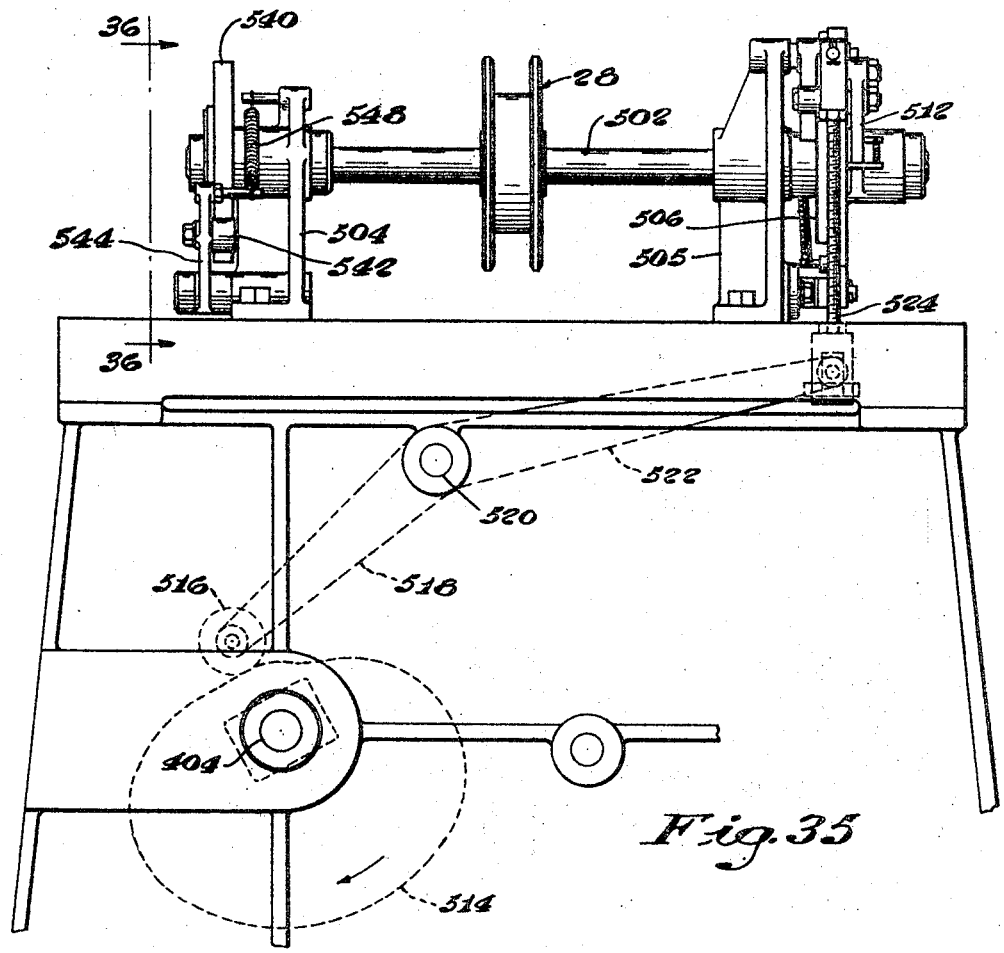
Figure 36:
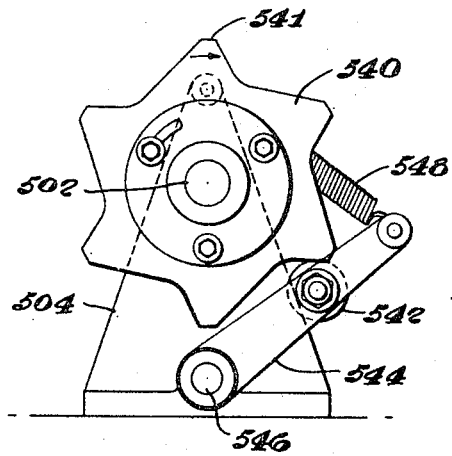
Figure 37:
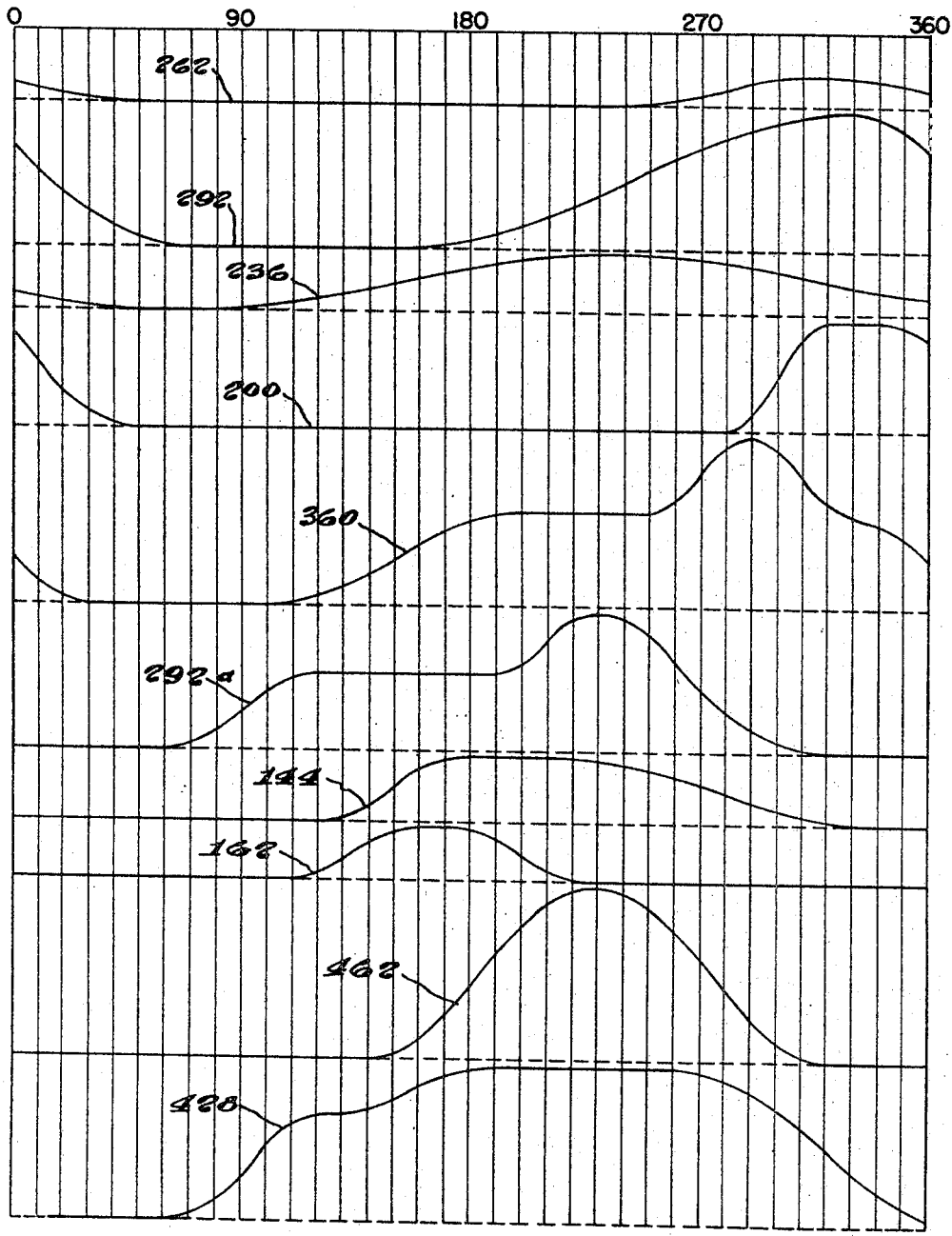

In the drawings illustrating the preferred embodiment of the invention, Fig. 1 is a front elevation of apparatus for producing tea bags embodying the different features of the present invention; Fig. 1a is a view comprising a continuation of the upper portion of the apparatus shown in Fig. 1 as viewed in side elevation and illustrating the web forming and filling mechanisms; Fig. 2 is a front elevation, partly in cross section of a portion of a carrier chain and bag supporting grippers illustrating the station at which the bags are received from the bag forming apparatus; Fig. 3 is an end view of the same as seen from the line 3—3 of Fig. 1 illustrating the mechanism for opening the grippers at the bag receiving station; Fig. 4 is a perspective view showing one of the grippers open and ready to receive a bag; Fig. 5 is a similar view showing the gripper closed about the bag and mechanism for severing the endmost bag from a strip of connected bag sections; Fig. 6 is a perspective view showing the mechanism for rotating a gripper unit to dispose the bag in a horizontal position for a purpose to be hereinafter described; Fig. 7 is a plan view of a duplex gripper unit; Fig. 8 is a front elevation of a portion of the gripper unit shown in Fig. 7; Fig. 9 is an end view of a portion of the gripper unit as viewed from the line 9—9 of Fig. 8; Fig. 10 is a perspective view of a portion of the twine controlling mechanism to be referred to; Fig. 11 is a side elevation of the same illustrating the operating mechanism therefor as viewed from the line 11—11 of Fig. 1; Figs. 12 and 13 are front and side elevations respectively of the tag feeding and severing mechanisms; Fig. 14 is a plan view detail of the tag feeding and severing mechanisms; Fig. 15 is a detail view in side elevation of the tag severing and string guiding means as viewed from the left in Fig. 14; Fig. 16 is a transverse sectional view on the line 16—16 of Fig. 1 illustrating the operating cams and connections for the tag feeding and severing mechanisms; Fig. 17 is a rear view as seen from the line 17—17 of Fig. 1 illustrating the wire feeding and tag stapling mechanism; Fig. 18 is a transverse sectional view taken on the line 18—18 of Fig. 1 illustrating the operating cam and connections for the tag stapling mechanism; Fig. 19 is a detail view in front elevation diagrammatically illustrating the sequence of operations for attaching a tag to a length of twine, winding the twine about the bag and attaching the twine to the bag; Figs. 20, 21 and 22 are perspective views further illustrating the steps of providing a length of twine with a tag, winding the twine about the bag and thereafter affixing both ends of the twine to the bag; Fig. 23 is a side elevation of mechanism for inserting the twine into one of the jaws of a bag supporting gripper unit; Fig. 24 is a front elevation of the twine inserting and guiding mechanism illustrated in Fig. 23; Fig. 25 is a transverse sectional view as seen from the line 25—25 of Fig. 1 illustrating the operating cams and connections to the string inserting mechanism; Fig. 26 is a similar view as seen from the line 26—26 of Fig. 1 and illustrating the operating cam and connections for the string cutting mechanism shown in Fig. 27; Fig. 27 is a rear view of the bag stapling mechanism together with the anvil operating and string cutting mechanism; Fig. 28 is a plan view of the bag releasing and ejecting mechanism; Fig. 29 is a transverse sectional view illustrating the operating cams and connections for the bag releasing and ejecting mechanism as seen from the line 29—29 of Fig. 1; Fig. 30 is a front elevation of the mechanism shown in Fig. 28 and illustrating the bag discharge chute; Fig. 31 is a detail view of a portion of the mechanism shown in Fig. 30; Fig. 32 is a side elevation of the mechanism shown in Fig. 30; Fig. 33 is a front elevation of the driving end of the carrier chain illustrating the intermittent operating mechanism therefor; Fig. 34 is a transverse sectional view illustrating the operating cam for the intermittent driving mechanism shown in Fig. 33; Fig. 35 is an end view of the intermittent driving mechanism; Fig. 36 is a detail view as seen from the line 36—36 of Fig. 35 to be referred to; Figs. 37 and 38 are cam charts indicating the relative timing of the various operating cams; Fig. 39 is a side elevation as viewed from the line 39—39 of Fig. 1 and illustrating a clutch mechanism for controlling the operation of the tagging mechanism; Fig. 40 is a plan view of the same; and Fig. 41 is a front elevation of a completed tagged bag as produced by the present apparatus.

The present invention viewed in its broader aspects, contemplates apparatus for automatically producing an infusion bag of the flat or pillow type having a handle comprising a tag and a length of twine connecting it and the bag. The apparatus is provided with mechanism for detachably disposing the tag in a position adjacent the bag and with the length of twine wound around and also disposed closely adjacent the body of the bag, to the end that the bags may be packed in a container with other similar bags, with minimum liability of entanglement of the handles.

More specifically the present invention contemplates a novel method of and apparatus for attaching a tag to an infusion bag, and particularly to a paper tea bag of the envelope or pillow type, such as is produced in a machine of the type illustrated and described in the United States Patent No. 2,385,229 issued to William S. Patterson, September 18, 1945. Such infusion bags are preferably produced in strip form in accordance with the method disclosed in the United States patent to Patterson, No. 2,272,530, issued February 10, 1942, and, in general, such method comprises folding an elongated strip longitudinally, simultaneously sealing the strip transversely and along the adjacent longitudinal edge to form a bag section, and then filling the bag section through the open top. Thereupon, in the operation of the machine, the strip is intermittently advanced one bag length and a succeeding and similar sealing operation closes the top of the filled bag section and forms a succeeding connected bag section. The bags thus formed are advanced to bag severing mechanism which operates to sever the strip through successive transverse sealed portions to form individual sealed bags, and in accordance with the present invention, successive bags thus severed from the strip are arranged to be grasped by successive grippers attached to and movable with an intermittently operated carrier chain, which is arranged to move the bag through the various stations of operation for attaching a handle comprising a tag and a length of twine to each individual bag in a novel manner such as to detachably secure the handle in proximity to the bag whereby to produce a tagged bag offering minimum liability of entanglement with other similar bags when packed in a container.

In accordance with the method herein disclosed one end of the twine is placed adjacent one edge of the bag and a tag is secured adjacent the other end of the twine leaving a short length of twine extending beyond the tag. The twine is then wound once about the bag to dispose the tag flat against the bag and to present the short length of twine extending beyond the tag, in proximity to the first end of the twine adjacent the edge of the bag. Both ends of the twine are then simultaneously secured to the edge of the bag. In practice, the short extended end of the twine may be pulled from under the fastening means by the consumer and the twine unwound and extended for use as a handle in the usual manner.

The present apparatus for attaching a tag to a bag is illustrated herein as embodied in a duplex type of bag forming machine having provision for forming two strips of connected bag sections simultaneously and the present tagging apparatus is likewise provided with simultaneously operated mechanisms arranged to receive each of the two bags severed from said strips and for simultaneously attaching a tag in the described manner to each of the two bags during the operation of the apparatus. Furthermore, the illustrated apparatus for attaching tags to the bags is arranged to be driven from and operated in timed relation to the bag forming apparatus thus providing a unitary bag forming and tagging machine for producing a filled and sealed bag which is tagged in a novel manner.

Referring now to the drawings, the present tagging apparatus indicated generally at 10 is herein illustrated as embodied in a bag making machine indicated generally at 12 in which provision is made for forming a series of connected filled and sealed bag sections 14 in strip form.

In general, the present bag forming and filling machine is provided with web withdrawing mechanism, indicated generally at 15, arranged to withdraw a predetermined length of web or bag forming material 17 from a supply roll 18 thereof. The bag forming material preferably comprises a porous, fibrous material containing a thermoplastic, pressure-responsive, binding material so that when two layers or plies of the material are brought together and subjected to the application of heat and pressure, they will become and remain adhesively united. The web of bag forming material 17 is then advanced past bag forming mechanism, indicated generally at 19 which operates to fold the web longitudinally along a medial line to bring together the two half sections of the web preparatory to forming a strip of connected bags. The bag forming material is preferably drawn over the bag forming mechanism 19 by gripping and advancing mechanism indicated generally at 16 operative to advance the strip one bag length each cycle of operation of the machine and to present the strip in operative relation to bag sealing mechanism 20 arranged to simultaneously seal the strip along a transverse zone 27 and an adjacent longitudinal zone 29 during each sealing operation to form a succession of connected bag sections, closed on one side by the folded edge 25, and heat sealed along successive zones 27 and 29. Upon sealing a bag section along the transverse and longitudinal zones as above described, provision is made for introducing a predetermined amount of the commodity, such as tea through the open edge of the web and between the fold of a partially formed bag section. The bag filling mechanism, indicated generally at 31, is operative to deposit successive charges of the commodity into successive bag sections in timed relation to the operation of the strip advancing and heat sealing mechanisms, and, in the operation of the machine, the open top of a bag which has been provided with a charge of the commodity during one cycle of operation, is closed during a succeeding cycle of operation. The heat sealing and bag filling mechanisms are preferably timed to operate and seal the bottom and side of the bag immediately prior to the operation of filling the bag. Thereupon, the strip is intermittently advanced to bag severing mechanism comprising blades 21, 23 which operate to sever the strip through successive transverse sealed portions to form individual filled and sealed bags. For a further and more detailed description of the construction and mode of operation of the bag making apparatus reference may be made to the United States Patent No. 2,385,229 issued to William S. Patterson, September 18, 1945.

Successive bags thus severed from the strip are arranged to be received in successive gripper units 22 which as herein shown are carried by and movable with an intermittently operated carrier chain 24 arranged to run over a driven sprocket 26 and a driving sprocket 28 disposed at the ends of the apparatus.

As above stated, the various mechanisms for operation upon the bags may and preferably will comprise duplicate units arranged to operate simultaneously to perform similar operations upon two bags, and as herein shown the carrier chain 24 is provided with similar gripper units 22 upon the two sides thereof. In the following description, unless otherwise indicated, the mechanisms for performing the various operations for attaching a tag to a bag will be described as applied to a bag disposed in one of the gripper units 22 carried on one side of the chain, it being understood that duplicate and interconnected mechanisms are arranged to perform similar operations on a bag disposed in the gripper unit 22 carried on the other side of the chain.

As best shown in Figs. 7 and 8, each gripper unit 22 comprises two pairs of cooperating jaws 30, 32 which are pivotally mounted on a stud 40 fixed in and extending through a rectangular hub member 34 secured to a shaft 36 journaled in a link member 38 attached to and forming a part of the carrier chain 24. Each pair of cooperating jaws 30, 32 is normally retained in its closed position by a coil spring 42, and each jaw is provided with an angularly extended abutment 44 by which the jaws may be opened by pressure exerted thereagainst. The jaws are arranged to rest against a stop rod 43 in order to retain them in alignment with each other and at right angles to the chain 24 when in their closed position. The stop rod 43 is supported by a plate 45 secured at one end of the pivot stud 40 extending between the lower ends of the jaws, the latter being recessed as indicated at 47 for this purpose.

Provision is made for opening the jaws 30, 32 of each gripper unit 22 at the bag receiving station indicated generally at 46, for holding the jaws open while the endmost bag section of a strip is advanced therebetween, and for thereafter permitting the jaws to close upon the bag section during which time the endmost bag section is severed from the strip by the shear blades 21, 23.

As best shown in Figs. 2 and 3, the mechanism for opening the jaws 30, 32 includes a bell crank 48 pivotally mounted at 50, one arm of which is provided with spaced members 52 arranged to engage the abutments 44 to effect opening of the jaws. The bell crank 48 is arranged to be rocked by a cam 54 fast on a cam shaft 56, forming a part of the bag making machine, and through connections including a roller 58 cooperating with the cam and carried by a lever 60 pivotally mounted on a rocker shaft 62. The lever 60 is connected by a link 64 to the second arm of the bell crank 48.

From the description thus far it will be observed that in the operation of the machine, when a gripper unit comes to rest at the bag receiving station 46, the bell crank 48 is rocked to effect opening of the jaws and the strip advancing mechanism 16 is operated to advance the strip one bag length disposing the endmost bag section thereof between the jaws, as illustrated in Fig. 4. Thereupon, the bell crank 48 is rocked outwardly to permit the jaws to close upon the bag section by the action of the coil springs 42, and when the bag section has been gripped, the shearing blades 21, 23 are operated to sever the endmost bag section from the strip, as shown in Fig. 5. It will be further observed that the companion gripper unit 22 disposed on the opposite side of the chain 24 is arranged to be operated to open the jaws thereof in a similar manner by the cam 54 through connections including a slide block 66 carried by the roller stud 68 and which is received in a slotted portion 70 of a similar cam lever 72, thus effecting simultaneous operation of the two gripper units.

In the continued operation of the machine, the gripper unit and the bag carried thereby are moved through the apparatus to the various mechanisms for performing the tagging operation. In general, the sequence of operations performed in the present apparatus and the mechanisms provided therefor include a station 74 at which the gripper unit 22 is rotated to a horizontal position as illustrated in Fig. 6. The gripper unit 22 is then advanced to a station, indicated generally at 76, see Fig. 21, at which station a length of twine 78, supplied from a roll 80 and extending from a preceding bag, is inserted in one of the jaws of the gripper adjacent one edge of the bag. The twine connected to the preceding bag is then severed at a point adjacent the edge of the preceding bag, as indicated at 81 and the twine is retracted by twine controlling mechanism, indicated generally at 82, to dispose the end of the twine adjacent the edge of the bag to be tagged. A tag 84 is then fed from a roll 85 thereof by tag feeding mechanism 86 into operative position to the extended length of twine, at a point spaced from the bag, and the tag is secured to the twine by stapling mechanism, indicated generally at 88. Thereafter, as the gripper unit is advanced, provision is made for rotating the unit 360°, as indicated at 90 in Fig. 21, to cause the bag to wind the twine thereabout with the tag flat against the bag as shown, and to dispose the length of twine extending beyond the tag in proximity to the end of the twine which was placed in one jaw of the gripper unit at the preceding station 76, the bag now being in the condition shown at 90 in Fig. 21 and in operative position for the stapling operation to secure the twine to the bag. The end of the twine held in the jaw and the extended length of twine adjacent thereto are then stapled to the edge of the bag, as shown at 92 in Fig. 22 by stapling mechanism indicated generally at 94, see Fig. 1, and the twine is severed at 81 to be again retracted into operative position to the succeeding bag. The gripper unit is then rotated 90° to again dispose the bag in a vertical position and the unit is advanced to bag ejecting mechanism, indicated generally at 96 to remove the completed bag from the gripper. The bag thus removed is delivered from the machine by discharge mechanism including a discharge chute 98.

Reference is now made to the drawings illustrating in detail the various mechanisms for attaching the tag to the bag as above described, and in accordance with the method herein defined. Referring first to Fig. 6, the mechanism for effecting rotation of the gripper unit 22 to dispose the bag in a horizontal position includes a stationary gear rack 100 secured to the carrier frame which is arranged to cooperate with a gear 102 fast on the gripper unit shaft 36 as best shown in Fig. 7. It will be observed that one of the upper gripper jaws 30 in the vertically disposed unit 22 shown in Fig. 8 is provided with an extended portion 104 having an opening 106 to accommodate the stapling mechanism to be hereinafter described. In order to dispose the bag in a horizontal position with the jaw 30 disposed on the right hand side as illustrated in Fig. 6, so that it will be in operative position with relation to the stapling mechanism at a subsequent station, the rack 100 is arranged to rotate the gripper unit through 270°, the bag being turned from a vertical position, through a horizontal position with the jaw 30 on the left hand side viewing Fig. 6 and then over to present the bag in the position illustrated in Fig. 6.

The mechanism indicated generally at 108 comprises a spring-pressed plate 110 which is arranged to bear against the carrier chain 24 to hold the gear 102 in operative position with relation to the rack 100. In the event that the chain 24 is inadvertently raised so that the gear 102 is out of mesh with its rack 100, a micro-switch 112 is arranged to be actuated to discontinue the operation of the machine.

Referring now to Fig. 9, in order to retain the gripper unit in the position to which it is rotated, a pawl and ratchet mechanism is provided at the opposite end of the gripper unit which includes a ratchet 114 fast on the gripper unit shaft 36, and two pawls 116, 118 which are held by a spring 122 in engagement with suitable notches 120 formed in the periphery of the ratchet 114. The spring 122 extends between the pawl arms 121, 123 and the latter are pivotally mounted on link pins 125, 127 disposed on opposite sides of the shaft 36. As herein shown, one of the pawl arms 121 is provided with a roller 124 arranged to engage a stationary cam piece 126 secured to the carrier frame in order to effect disengagement of the pawl 116 from its ratchet at the time the gear 102 engages the rack 100 and to permit the unit to rotate in a clockwise direction viewing Fig. 6, the pawl 118 being permitted to slip out of its notch at this time. The respective notches 120 are disposed 270° apart in the periphery of the ratchet 114 so that at the end of 270° rotation of the gripper unit the pawls are permitted to fall into engagement with their respective notches to retain the unit in the position shown in Fig. 6.

The bag thus disposed in its horizontal position is now advanced to station 76, see Fig. 21, at which station provision is made for inserting the extended length of twine 78 into the jaw 30. As herein shown, at this time the twine extends from the preceding bag, across the gripper unit into which the twine is to be inserted, and then between a slotted guide member 127 to the twine controlling mechanism 82. In order to receive and retain the twine in the jaw 30, the latter is provided with a spring arm 136 having an offset twine engaging portion 137 arranged to extend into a slot 139 formed in one of the jaws 30 as shown in Figs. 7 and 8.

Referring now particularly to Fig. 23, the twine inserting mechanism is arranged to rock the upper one of the pair of jaws 30 upwardly as shown, and to move the spring arm 136 out of the slot 139 in the jaw to dispose the parts in a position to receive the length of twine extending thereacross between the spring arm and its jaw member. The mechanism for disposing the parts in such position includes a cam operated arm 128 which is arranged to engage one of the abutments 44 to rock the upper jaw out of engagement with its cooperating jaw. The arm 128 forms part of a bell crank pivotally mounted at 130, the other arm 132 of which is provided with a foot 134 arranged to be moved into the path of the end of the spring arm 136 while the jaw is being rocked upwardly so as to move the spring arm out of the slot in the jaw during the continued upward movement of the latter, thus providing a space through which the twine may pass to be received in the offset portion 137. As illustrated in Fig. 23, the twine 78 extending above and across the unit is engaged by the spring arm 136 during the upward movement of the latter and while disposed in this position a twine inserting member comprising a rod 138 is rocked against the twine to urge it into the offset portion 137 of the spring arm. Thereupon, in the operation of the machine, the arm 128 and foot 134 are rocked in a counter-clockwise direction viewing Fig. 23 to permit the twine to be grasped between the spring arm and its gripper jaw and to permit the jaw to again close upon the bag. During this time the lower one of the cooperating jaws 30 remains in its horizontally extended position being held by the stop rod 43 as described.

As shown in Figs. 23 and 25, the arm 132 is rocked on its pivot 130 to effect opening and closing of the jaw 30 by a cam 162 fast on a hollow shaft 146 and through connections including a cam roller 164 carried by one arm of a three-armed lever pivotally mounted at 148, a second arm 166 of which is connected by a link 168 to the arm 132. A third arm 170 of the three-armed lever is connected by similar linkage to the jaw opening mechanism carried by the other side of the chain. The rod 138 is extended from a lever 140 pivotally mounted at 142 and is arranged to be rocked to perform the inserting operation by a cam 144 fast on the hollow shaft 146. A three-armed cam lever 147 pivotally mounted at 148 carries a roller 150 on one arm thereof which cooperates with the cam 144 and a second arm 152 is connected to the lever 140. The duplicate gripper unit on the other side of the carrier chain is similarly operated from the cam 144 through connections including a third arm 154 connected by a link 156 to a bell crank 158 which is in turn connected by a link 160 to the twine inserting operating arm.

In the operation of the machine, the twine 78 is now severed at a point indicated at 81 in Fig. 22 adjacent the edge of the preceding bag, and provision is made for retracting the twine a distance sufficient to dispose the end of the twine extended slightly beyond the jaw 30 as indicated at 83 in Fig. 20. During the severing operation, the twine 78 is yieldingly held by the spring arm 136 under the jaw 30 and extends through the slotted guide member 127, past the tag stapling mechanism 88, then at right angles around a guide roller 184, through an opening 182 formed in the end of a pivot stud 174 and then around an overhead guide roller 180 to the supply roll 80. In order to retract the twine to present the severed end adjacent the jaw 30 provision is made for clamping the twine intermediate the severed end and the supply roll to prevent withdrawal of the twine from the supply roll during the retracting operation. For this purpose, a pair of clamping jaws is provided between the roller 184 and the guide opening 182 which includes a stationary jaw 178 extending from a supporting frame 185, and a cooperating movable jaw 179 pivoted on a stud 186 also extended from the frame 185 as clearly shown in Fig. 10. The clamping jaw 179 is provided with an extension 188 having a spring stud 196 to which a spring 198 is connected for urging the movable jaw 179 into twine clamping position with the stationary jaw 178.

While the twine is thus held between the jaws 178, 179 the severed end of the twine is retracted by an arm 172 pivotally mounted on the stud 174 and which is provided with a pin 176 extending across the twine as shown in Figs. 10 and 11. In operation, the arm 172 is arranged to be rocked downwardly to move the pin 176 from the position shown in full lines in Fig. 11, to the position shown in dotted lines in Fig. 11 to effect retraction of the twine as described. As herein shown, the arm 172 is connected by a link 206 to one arm 204 of a three-armed lever pivotally mounted at 148, a second arm 201 of which carries a roller 202 arranged to cooperate with a cam 200 fast on the hollow shaft 146. In order to release the twine to permit withdrawal from the supply roll 80 after the retracting operation, the movable jaw 179 is arranged to be rocked away from the jaw 178 by a link 190 which is connected at one end to an extension 192 of the rocking arm 172. The other end of the link 190 is provided with a slotted portion 194 through which the spring pin 196 extends so that in operation when the arm 172 is rocked upwardly the end of the slot 194 engages the pin 196 to rock the jaw 179 in a clockwise direction, viewing Fig. 11, to release the twine. A third arm 208 of the three-armed lever is connected by a link 210 to a bell crank 212 for operating similar mechanism carried by the other side of the carrier chain 24.

Upon retraction of the twine as above described, provision is made for stapling a tag to the extended length of twine 78 at a point spaced from the bag, as indicated in Fig. 20. The tags 84 are supplied in strip form from the roll 85 thereof, as shown in Fig. 1, and the strip is guided around a roller 214 and over the curved end of a stationary guide plate 216 forming a part of the tag feeding or indexing mechanism 86. As illustrated in Figs. 12, 13, 14 and 15 the tag feeding mechanism includes a slide member 218 reciprocatingly mounted on a bar 220 supported by a bracket 222 attached to the machine frame. The tag strip is guided between the plate 216 and an upper guide plate 224 secured to the slide 218 and is arranged to be intermittently advanced by the slide member 218 a distance of one tag length each cycle of operation to present the endmost tag on a base plate 226 supported on the end of the bar 220. As herein shown, the slide member 218 carries a spring pressed member 228 having a V-shaped extension 230 arranged to engage V-shaped cutouts 232 formed at spaced intervals in the edge of the tag strip. Thus, in operation, when the slide member is moved forward the tag strip is advanced one tag length and when the slide member is retracted, the V-shaped extension 230 slips out of one notch 232 and engages with a succeeding notch. As best shown in Fig. 12, the inner end of the guide plate 216 is provided with a sharp upturned portion 234 which engages the underside of the strip to prevent retraction of the same when the slide member is retracted.

The slide member 218 is arranged to be reciprocated by a cam 236 fast on the hollow shaft 146, see Fig. 16, and through connections including a cooperating cam roller 238 carried by one arm 240 of a three-armed lever pivotally mounted on the shaft 148. A second arm 242 of the three-armed lever is connected by a link 244 to one arm of a bell crank 245, the other arm of which is connected to the slide member 218 by a link 246 as shown in Fig. 12. The bell crank 245 is pivoted on a stud 248 supported in the bracket 222. A third arm 250 of the three-armed lever is connected by a link 252 to a bell crank 254 for simultaneously operating the tag advancing mechanism disposed on the opposite side of the chain.

In the operation of the machine, upon advancement of a tag onto the base member 226 and into operative position to be stapled to the twine, as above described, provision is made for severing the endmost tag from the strip. As shown in Figs. 14 and 15 the tag is severed from the strip by a shear blade 256 which cooperates with one edge of the base member 226. The blade 256 is secured to an arm 258 pivotally mounted on a stud 260 fast in the base member 226 and is arranged to be rocked to perform the severing operation by a cam 262 fast on the hollow shaft 146. A cooperating cam roll 264 is carried by one arm 266 of a three-armed lever pivotally mounted at 148, and a second arm 268 of the three-armed lever is connected by a link 270 to one end of a lever 272 rockingly mounted on the stud 248. The other end of the lever 272 is connected to the arm 258 by a link 274. A third arm 275 of the three-armed lever is connected through suitable linkage to a similar device for simultaneously severing the endmost tag of a strip being fed to the tag stapling mechanism disposed on the other side of the chain.

A spring 261 coiled about the stud 260 and interposed between the arm 258 and the headed end of the stud yieldingly urges the blade against the cooperating edge of the base member 226 during the severing operation. As best shown in Fig. 12, the forward end of the tag strip extends between the upper guide plate 224 and a curved spring 225 supported on the bar 220, the spring serving to yieldingly support the end of the strip during the severing operation and to guide the severed end onto the base plate 226 during a succeeding strip advancing operation.

From the description thus far it will be observed that a tag 84 is now in operative position to be attached to the twine extending thereacross. As best shown in Fig. 17, the mechanism for attaching the tag includes the stapling unit 88, which may be of any usual or preferred type, and which is supported above and in operative position to the tag and the twine. The stapling unit is secured to a supporting bar 278 extending across the machine and the latter is secured at opposite ends to brackets 280 attached to the machine frame. The illustrated stapling unit 88 comprises a vertically disposed guide 282 in which a slide member 284 is arranged to be vertically reciprocated to perform the stapling operation. The slide member 284 is connected to the staple forming and attaching mechanism by a toggle link 286 one end of which is connected to a stud 288 which extends through the slide 284 and is secured to a horizontally extended operating bar 290 which also receives a similar stud from the duplicate stapling unit on the opposite side of the machine. As herein shown, the operating bar 290 is arranged to be raised and lowered by a cam 292 fast on the hollow shaft 146, as shown in Fig. 18, and through connections including a cooperating cam roll 294 carried by one arm 296 of a three-armed lever pivotally mounted at 148. A second arm 298 of the three-armed lever is connected by a link 300 to one end of the operating bar 290 and the third arm 302 to the three-armed lever is connected by a link 304 to a bell crank 306 which in turn is connected to the other end of the operating bar by a link 308.

As illustrated in Fig. 17, the wire for the stapling unit is supplied from a roll 310 thereof which is rotatably supported in a bracket 312. The wire is guided past rollers 314 and through a wire feeding device indicated generally at 316, the latter being operated by the movement of the operating bar 290. In general, in the operation of the stapling unit, when the operating bar 290 is lowered, a staple is applied over the twine and into the tag, and, when the bar is elevated, the stapling unit is reset to apply a staple during the next cycle of operation. Since the stapling unit of itself forms no part of the present invention, it is thought that the above description of the construction and mode of operation thereof will suffice.

From the description thus far, it will be observed that the bag and the twine are now disposed in the condition illustrated in Fig. 20, with the free end of the twine under the jaw 30 and the extended end of the twine provided with a tag stapled thereto. In the continued operation of the machine, the gripper unit 22 is now advanced and rotated to effect winding of the twine about the bag. This operation is effected by a rack 318 secured to the carrier frame and arranged to cooperate with the gear 102 of the gripper unit. When the gripper unit comes to rest in the position at which the tag is stapled to the extended length of twine, as shown in Fig. 20, the gear 102 is disposed in engagement with the end of the rack 318 so that upon intermittent movement of the carrier chain 24 to the next station of operation the gripper unit is rotated 360° to assume the position shown in Fig. 21, with the bag in a horizontal position and the twine wound once about the bag, the tag being disposed against the bag and under the twine, as illustrated in Figs. 21 and 22.

Provision is made for guiding the twine and the tag during the winding operation to prevent twisting of the tag on the twine and to dispose the tag as described. As best shown in Fig. 19, at the start of the winding operation, the twine extends from under the jaw 30 upwardly through the slotted guide 127 with the tag 84 disposed in the position indicated in full lines. Upon rotation of the gripper unit the twine is pulled along with the bag and the tag passes over the upper surface of the guide 127. An upper guide member 320 depending from a bracket 322 attached to the machine frame is arranged to cooperate with the guide 127 to maintain the tag in a substantially horizontal position during the passage of the tag therebetween. When the tag attached to the twine is drawn beyond the guides 127, 320, it engages a flexible and yieldable guide member 324 hinged at 326 to a member secured to the guide 320. A curved spring 328 also attached to the guide 320 is arranged to urge the member 324 downwardly against the twine and tag passing thereby. The member 324 thus serves to keep the tag from twisting on the twine through the different positions which the twine and tag assume during the rotation of the bag, as indicated in dotted lines in Fig. 19.

The bag is now in the condition illustrated in Fig. 21, the twine extending from under the upper one of the jaws 30, around the adjacent edge thereof and over the opposing edge, from which position the twine extends over the bag with the tag between the twine and the bag, the twine extending beyond the tag and parallel to the end held under the jaw. It will be observed that the outer edge of the projecting portion 104 of the lower one of the jaws 30, see Fig. 8, extends substantially to the adjacent edge of the bag thus providing a rigid edge over which the twine is wound. At the opposing edge of the bag the twine passes around the jaws 32, as clearly shown in Fig. 21.

Provision is now made for stapling the twine to the bag by the bag stapling unit 94, the staple being arranged to embrace both the free end of the twine extending from the jaw 30 and the extended portion thereof as indicated at 92 in Fig. 22, and simultaaneously therewith or immediately thereafter the extended length of twine is arranged to be severed adjacent the bag, as indicated at 81 in Fig. 22. As best shown in Fig. 27, the stapling unit 94 therein illustrated is similar in construction and mode of operation to the tag stapling unit 88 previously described, the present unit 94 being supported in a crosss bar 330 and actuated by an operating bar 332 arranged to be raised and lowered by a cam and through connections similar to those shown in Fig. 18 for the tag stapling mechanism.

Cooperating with the bag stapling unit 94 is a movable anvil 334 pivotally mounted on a stud 336 supported in a bracket 338 attached to the machine frame. In operation, the anvil 334 and its associated mechanism is arranged to be rocked into operative position to the stapling unit after the gripper unit and bag have been moved into position to be stapled, and, to be rocked out of the way of the gripper unit after the stapling operation. A spring 340 extending from the anvil 334 to a corresponding anvil of the bag stapling unit disposed on the opposite side of the machine is arranged to urge the anvil into operative position, as shown in full lines in Fig. 27, an extension 342 of the anvil being arranged to engage an adjustable stop screw 344, supported in the bracket 338 to limit the movement of the anvil in a counter-clockwise direction. The anvil is arranged to be moved in a clockwise direction viewing Fig. 27 by a bell crank, also pivoted at 336, one arm 346 of which is arranged to engage a hub 348 of the anvil to effect rocking movement thereof. The second arm 350 of the bell crank is connected by a link 352 to one arm 354 of a three-armed lever, a second arm 356 of which carries a roller 358 cooperating with a cam 360 fast on the hollow shaft 146. A third arm 362 of the three-armed lever is connected by a link 364 to a bell crank 366 which in turn is connected by a link to similar simultaneously operated mechanism for the bag disposed in the opposing gripper unit.

During the stapling operation, the stapling unit 94 and the cooperating anvil 334 are in alignment with the opening 106 provided in the extended portion 104 of the jaw 30 to permit the twine to be stapled to the bag as described. Immediately after the stapling operation is performed, a cuttter blade 370 pivotally carried by the anvil 334 and arranged to cooperate with an adjacent edge of the anvil, is actuated to sever the twine adjacent the bag by the continued movement of the arm 350 after the anvil has come to rest against the stop 344. The cutter blade 370 is connected by a link 372 to the arm 350. In operation, the initial movement of the arm 350 in a counter-clockwise direction viewing Fig. 27 permits the spring 340 to bring the anvil into a vertical position, the cutter blade at this time being in an extended position as indicated in dotted lines. When the anvil comes to rest continued movement of the arm effects rocking of the blade, as described.

As illustrated in Fig. 22, the gear 102 of the gripper unit 22 is in mesh with the rack 318 during the stapling operation. Upon intermittent movement of the gripper unit to the next station of operation, initial movement thereof will effect rotation of the gripper unit 90° to dispose the bag in a vertical position whereupon the gear 102 rides off the end of the rack 318. The gripper unit at this time is held from further rotation by the pawls 116, 118 engaging a different set of notches 120 as will be apparent from the spacing of the notches, as illustrated in Fig. 9.

Referring now to Figs. 28 and 30, at the next station of operation the bag is withdrawn from the gripper and discharged from the machine by the mechanism indicated generally at 96. As therein shown, the bag withdrawing mechanism includes a reciprocating bar 375 having an extended portion 374 arranged to engage the abutments 44 on one side of the gripper jaws 30, 32 to effect a slight opening thereof, and, a second reciprocating bar 376 having provision for grasping the bag and withdrawing it from the gripper while the jaws are in their open position. As better shown in Fig. 32, the reciprocating bars 375 and 376 are slidingly supported in grooves 378, 380 formed in a bracket 382 attached to the machine frame, the bars being retained in the grooves by gibs 384.

As herein shown, the bag withdrawing bar 376 is provided with an extended portion 386 which is arranged to engage one face of the bag adjacent the upper edge thereof and substantially in alignment with the opening 106 of the extended portion 104 of the gripper, and a cooperating finger 388 pivotally mounted on the bar 376 is arranged to engage the opposite face of the bag cooperating with the bar to grasp the bag there-between. The pivotally mounted finger 388 is normally urged into bag gripping position by a spring 390, and is arranged to be rocked into and out of bag gripping position by engagement with a bar 392 carried by and extending from the reciprocating bar 375. The pivotal finger is provided with an arm 394 which carries a roller 396 arranged to cooperate with the extended bar 392. In the operation of the device, both bars 375, 376 are advanced into operative position as shown in full lines in Fig. 28 whereupon the bar 375 is extended to the dotted line position into engagement with the abutments 44 to effect opening of the jaws, this movement also advancing the bar 392 to permit the finger 388 to close upon the bag. Thereupon the bar 376 is retracted to withdraw the bag from the jaws 30-32 and to dispose it immediately above a guide chute 398, at which time the bar 375 is retracted to present the extended bar 392 into engagement with the roller 396 to effect rocking of the finger 388, and release of the bag into the chute 398. As shown in Figs. 28, 30 a second arm 400 secured to the pivot stud 395 is provided with a hooked end which is arranged to engage the twine wound about the lower jaws 32 when the finger 388 is closed into bag gripping position, and to draw the twine over the fingers 32 during the withdrawing operation.

Referring now to Fig. 29, the bar 375 is arranged to be reciprocated as above described by a cam 402 fast on the cam shaft 404, and through connections including a cooperating roller 406 carried by one arm 408 of a bell crank pivotally mounted at 410. The arm 408 is connected by link 412 to one arm 414 of a three-armed lever, a second arm 416 of which is connected by a link 418 to an arm 420 forming one arm of a bell crank pivotally mounted on a shaft 422. A second arm 424 is connected by a link 426 to one end of the reciprocating bar 375. The reciprocating bar 376 is arranged to be actuated, as above described, by a cam 428 fast on the cam shaft 404, and through connections including a cooperating roller 430 carried by one arm 432 of a bell crank pivotally mounted at 410. The arm 432 is connected by a link 434 to one arm 436 of a three-armed lever, a second arm 438 of which is connected by a link 440 to one arm 442 of a bell crank also pivotally mounted on the shaft 422. The second arm 444 of the bell crank is connected by a link 446 to the end of the bar 376, as clearly shown in Fig. 28. The three-armed levers are connected by springs 448, 449 to the third arms thereof to retain the rollers 406, 430 in cooperative engagement with their respective cams 402 and 428. An additional spring 450 is connected to a stud 452 extending from the bar 376 to urge the bar into its retracted or withdrawing position. The second arms 451 and 453 of the bell cranks 408 and 432 are connected by links 455 and 457 to similar bag withdrawing and jaw opening mechanism for withdrawing the bag from the gripper unit disposed on the opposite side of the machine.

Referring now to Fig. 32, upon release of the completed bag from the withdrawing device into the guide chute 398, the bag falls by gravity to the lower end of the chute into a position to be engaged by a pusher arm 456 which is arranged to be rocked in timed relation to the bag releasing mechanism to move successive bags from the lower end of the guide chute 398 into a substantially vertical position in the discharge chute 98. As herein shown, the pusher arm 456 is fast on a rocker shaft 458 journaled in bearing brackets 460 depending from the underside of the machine frame and the arm is actuated by a cam 462 fast on the cam shaft 404 through connections including a cam roller 464 carried by one arm 466 of a two-armed lever, the second arm 468 of which is connected by a link 470 to an arm 472 fast on the shaft 458. A similar pusher arm also fast on the shaft 458 may be disposed on the opposite side of the machine for discharging the bags released from the simultaneously operated gripper unit.

In operation, the pusher arm 456 advances successive bags from their released position along the chute 98 and into engagement with the previously released bags which are stacked upright in the chute for convenience in removing the completed bags therefrom. As shown in Fig. 32 one side wall of the delivery chute 98, preferably the wall adjacent the "fin" or sealed edge of the upright bag, is provided with an elongated and extended coil spring 473 arranged to engage said edges of the bags to effectively maintain the latter in an upright condition as they are moved along the chute.

Referring now to Figs. 33 and 35, the driven sprocket 28 over which the gripper-carrying chain 24 runs is arranged to be rotated to effect intermittent movement thereof by a pawl and ratchet type of indexing mechanism indicated generally at 500. As herein shown, the sprocket 28 is fast on a shaft 502 journaled in brackets 504, 505 attached to the machine frame. The indexing mechanism includes a ratchet disk 506 fast on the shaft 502 and provided with a plurality of equally spaced notches 508 in the periphery thereof which are arranged to be successively engaged by a spring pressed driving pawl 510 pivotally carried by an arm 512. The arm 512 is rockingly mounted on the end of the shaft 502 and is arranged to be rocked to effect intermittent rotation of the disk 506 by a cam 514 fast on the cam shaft 404, and through connections including a cam roll 516 carried by one arm 518 of a two-armed lever pivotally mounted on the rocker shaft 520. The second arm 522 of the two-armed lever is connected by a link 524 to the rocker arm 512. As shown in Fig. 34, a spring 526 is provided to hold the cam roll 516 against its cam. A second spring pressed pawl 528 comprising an indexing pawl is pivotally mounted at 530 in the bracket 505 and is arranged to drop into a notch 508 when the driving pawl 510 reaches the end of its advancing stroke. As herein shown, the indexing pawl 528 is provided with a tail portion 531 arranged to be engaged by a hub 533 of the driving pawl to lift the indexing pawl out of its notch upon the return stroke of the driving pawl 510, and the tail portion 531 is designed to hold the pawl 528 out of engagement with the disk 506 and the adjacent notch 508 during the initial portion of the advancing stroke. A third spring pressed pawl 532, which is pivotally mounted at 534 in a bracket attached to the member 505, is arranged to drop into a notch 508 at the end of the advancing stroke to prevent reverse movement of the disk 506 during the retracting stroke of the driving pawl arm 512. As illustrated in Fig. 2, the usual provision for tightening the chain may be provided, and may include an adjustable bearing member 536 which is held in its adjusted position by an adjusting screw 538. The other end of the shaft 502, as best shown in Figs. 35 and 36, is provided with a retarding cam 540 which is engaged by a roller 542 carried by an arm 544 pivotally mounted at 546 in the bracket 504. A spring 548 is arranged to hold the cam roll 542 in engagement with the cam 540. As illustrated in Fig. 36, the cam 540 is provided with a plurality of high points or teeth 541 corresponding to the number of notches 508 in the indexing disk 506. In operation, the engagement of the spring held roller 542 against a tooth 541 during the advancing movement of the disk 506 serves as a yieldable resistance to the rotation of the shaft 502 to assist in bringing the shaft to an abrupt stop and thus prevent rotation thereof beyond the predetermined index point.

As above stated, the present tagging apparatus 10 is driven from and operated in timed relation to the bag making machine 12. As best shown in Figs. 1 and 3, the bag making machine is driven by a motor 560 connected by a belt 562 to a pulley 564 forming part of a clutch mechanism indicated generally at 568 and arranged to be engaged to drive a gear 570 upon operation of the clutch handle 572. The gear 570 is arranged to drive the main cam shaft 56 of the bag forming mechanism through a gear train 574, 576 and 578, the latter being fast on the cam shaft 56. The gear 578 is arranged to mesh with a similar gear 580 fast on the main cam shaft 404 of the tagging apparatus to effect rotation of the latter at the same rate of speed as the main cam shaft 56.

Referring now to Fig. 1, the hollow cam shaft or sleeve 146, upon which the operating cams for the tag applying and twine winding mechanisms are mounted, is arranged to normally rotate with the main cam shaft 404. As better shown in Figs. 39 and 40, the driving gear 580 is fast on the end of the cam shaft 404 and abuts the end of the sleeve 146. A ratchet 582 secured to the gear 580 by bolts 584 is rotatably fitted over the end of the sleeve 146, as illustrated. A pair of spring pressed pawls 586, carried by a pawl carrier disk 588 fast on the sleeve 146, is arranged to normally engage notches 590 formed in the ratchet 582 to effect rotation of the sleeve 146 with the shaft 404.

Provision is made for discontinuing the drive to the sleeve 146 and thus render inoperative the mechanisms for attaching a tag and winding the twine about the bag so that when desired untagged bags may be permitted to pass through the machine to be withdrawn from the grippers 22 and discharged into the guide chute as previously described. For this purpose, a manually operated spring pressed plunger 592 is provided, and as shown in Fig. 39, the plunger is slidingly mounted in a bracket 594 attached to the machine frame. The plunger is provided with a V-shaped end arranged to engage the extended arms 596, 598 of the spring pressed pawls 586 and to effect rocking thereof and disengagement of the pawls from their notches 590. The ends of the pawls are arranged to overlap, as illustrated in Fig. 40, one of the arms 596 being provided with a pin 600 which is received in a slot 602 formed in the arm 598. The end of the plunger is also arranged to extend into an opening 606 formed in the pawl carrier disk 588 to thus lock the disk from rotation. The other end of the plunger 592 is provided with a cross pin 608 which is arranged to rest in a slot formed in the end of the hub 610 to hold the plunger in its inoperative position, and the hub 610 is provided with a second deeper slot 612 in which the cross pin 608 is received when the plunger is in its inward or pawl disengaging position.

Figs. 37 and 38 diagrammatically illustrate the cam paths of the various cams by which the relative movement and timing of the various operating mechanisms may be followed through one cycle of operation.

From the above description, it will be observed that the present invention provides a novel and improved method of and apparatus for producing a bag having a handle comprising a tag and a length of twine connecting the tag and the bag with the handle wound about the bag in a manner such as to reduce to a minimum entanglement with adjacent bags of a group thereof packed in a container.

While the preferred embodiment of the invention has been herein illustrated and described it will be understood that the invention may be embodied in other forms within the scope of the following claims.

Having thus described the invention, what is claimed is:

1. In apparatus for producing non-tangling infusion bags of the type provided with handles, in combination, means for forming a strip of connected, filled and closed rectangular-shaped bag sections, means for severing successive endmost bag sections from the strip, conveying means having a plurality of grippers arranged to receive successive endmost bag sections prior to severance from the strip, and means for attaching a handle comprising a length of twine and a tag to each of successive bags while supported in said grippers, said last named means including means for retaining one end portion of said length of twine adjacent one edge of said bag, means for fastening a tag to the end of said twine remote from the bag, means for rotating the bag to effect winding of the twine about the bag and to dispose the tag in proximity to the bag with the extended end of the twine adjacent said one end portion, and means for thereafter fastening both ends of the twine to the bag.

2. In apparatus for producing non-tangling infusion bags of the type provided with handles, in combination, means for forming a strip of connected, filled and closed rectangular-shaped bag sections, means for severing successive endmost bag sections from the strip, conveying means having a plurality of grippers arranged to receive successive endmost bag sections prior to severance from the strip, and means for attaching a handle comprising a length of twine and a tag to each of successive bags while supported in said grippers, said last named means including means for retaining one end portion of said length of twine adjacent one edge of said bag, means for fastening a tag to the end of said twine remote from the bag, means for rotating the bag to effect winding of the twine about the bag and to dispose the tag in proximity to the bag with the extended end portion of the twine adjacent said one end portion, and means for thereafter fastening both ends of the twine to the bag, said extended end being detachably fastened to the bag to permit removal thereof from the fastening means and to permit extension of the handle for use.

3. In apparatus for producing non-tangling infusion bags of the type provided with handles, in combination, means for forming a strip of connected, filled and closed bag sections, means for severing successive endmost sections from the strip, conveying means having a plurality of grippers arranged to receive successive endmost bag sections prior to severance from the strip, and means for attaching a handle comprising a length of twine and a tag to each of successive bags while supported in said grippers, said last named means including means for presenting a length of twine in operative relation to a bag, means for relatively moving the twine and bag to effect the winding of the twine about the bag, and means for fastening the twine to the tag and the bag with the tag end of the twine detachably secured to the bag, and with the tag adjacent the bag.

4. For use with a bag forming, filling and closing machine, mechanism for attaching to a bag a handle comprising a tag and a length of twine connecting the tag and the bag, comprising a conveyor having a plurality of grippers arranged to receive and support successive bags, means for presenting a length of twine in operative position to a bag, means for relatively moving the twine and bag to wind the twine about the bag, and means for fastening the twine to the tag and the bag with the tag end of the twine detachably secured to the bag and with the tag adjacent the bag.

5. In a bag forming, filling and closing machine, mechanism for attaching a handle comprising a tag and a length of twine connecting the tag and the bag, comprising a conveyer having a plurality of grippers arranged to receive and support successive bags, means for presenting one end portion of a length of twine in operative position to a bag, means for fastening a tag to the extended end of said twine, means for rotating the bag to effect winding of the twine about the bag and to dispose the tag in proximity to the bag, and means for fastening both end portions of the twine to the bag, with the tag end detachably fastened to the bag to permit removal thereof and the extension of the handle for use.

6. In apparatus for producing non-tangling infusion bags of the envelope type provided with handles, in combination, bag forming means, bag filling means, bag sealing means for top closing a filled bag, tagging means for attaching a handle comprising a length of twine and a tag to the filled and closed bag, and conveying means for moving successive bags to positions to be operated upon by the bag filling, bag sealing and bag tagging mechanisms, said tagging mechanism including means for relatively moving the twine and bag to wind the twine closely around the body of the bag and for detachably securing the handle to the bag with the tag disposed immediately adjacent the bag.

7. In apparatus for producing infusion bags, in combination, means for supporting and conveying a filled and closed bag, means for retaining one end of a length of twine adjacent a bag disposed in said supporting means, means for fastening a tag to the end portion of said twine remote from the bag, means for rotating said supporting means to effect winding of the twine about the bag, and means for thereafter fastening both ends of the twine to the bag with the tagged end thereof detachable from the bag.

8. In apparatus of the character described, in combination, means for supporting a filled and closed bag, means for supporting a length of twine in predetermined position with relation to the bag, means for fastening a tag to one end of said twine, means for relatively moving the bag and the twine to effect winding of the twine about the bag, and means for thereafter fastening both ends of the twine to the bag with the tagged end thereof detachable from the bag.

9. In a machine for producing bags having handles disposed in non-tangling relation, the combination with bag making mechanism, of means for attaching to the bag a handle comprising a tag and a length of twine connecting the tag and the bag, including means for securing a tag to a length of twine, means for winding the twine about the bag, and means for thereafter securing both ends of the twine to the bag, with the tagged end thereof detachable from the bag.

10. In a machine for producing bags having handles disposed in non-tangling relation, the combination with bag making mechanism, of means for attaching to the bag a handle comprising a tag and a length of twine connecting the tag and the bag, including means for presenting a length of twine in operative relation to a bag, means for relatively moving the twine and bag to wind the twine about the bag, and means for fastening the twine to the tag and the bag in a manner such as to permit detachment of the tag end of the twine and extension of the handle for use.

11. In apparatus for producing infusion bags, in combination, an intermittently operated carrier chain having a plurality of rotatable grippers for supporting and conveying successive bags, means for inserting into a gripper one end of a length of twine adjacent one edge of a bag supported in said grippers, means for fastening a tag to the extended end of said twine at a point spaced from the bag, means for rotating the gripper as it is advanced to effect winding of the twine about the bag and to dispose the tag in proximity to the bag with the extended end of the twine adjacent said one end thereof, and means for thereafter fastening both ends of the twine to the bag, with the tagged end detachable from the bag.

12. In apparatus for producing infusion bags in combination, an intermittently operated carrier chain having a plurality of rotatable grippers for supporting and conveying successive bags, means for inserting into a gripper one end of a length of twine adjacent one edge of a bag held by the gripper, means for fastening a tag to the extended end of said twine at a point spaced from the bag, means for rotating the gripper as it is advanced to effect winding of the twine about the bag and to dispose the tag in proximity to the bag with the extended end of the twine adjacent said one end thereof, and means for thereafter fastening both ends of the twine to the bag with the tagged end detachable from the bag, and means for withdrawing and ejecting successive completed bags from successive grippers.

13. In apparatus for producing infusion bags, in combination, an intermittently operated carrier chain having a plurality of rotatable grippers for supporting and conveying successive bags, means for inserting into a gripper one end of a length of twine adjacent one edge of a bag held by the gripper, means for fastening a tag to the extended end of said twine at a point spaced from the bag including means for feeding a tag into operative position with relation to said twine, means for rotating the gripper as it is advanced to effect winding of the twine about the bag and to dispose the tag in proximity to the bag with the extended end of the twine adjacent said one end thereof, and means for thereafter fastening both ends of the twine to the bag, with the tagged end detachable from the bag.

14. In apparatus for producing infusion bags, in combination, an intermittently operated carrier chain having a plurality of rotatable grippers for supporting and conveying successive bags, and means for attaching a handle comprising a tag and a length of twine connecting the tag and the bag to successive bags, including means for supporting a length of twine in operative relation to a bag, said twine extending from a preceding tagged bag and above the bag to be tagged; means for inserting into the gripper a portion of the extended twine adjacent one edge of said bag, means for severing the twine adjacent the edge of said preceding bag, means for retracting the twine held in said gripper to dispose said severed end adjacent said one edge of the bag, means for fastening a tag to the twine at a point spaced from the bag, means for rotating the gripper as it is intermittently advanced to effect winding of the twine about the bag and to dispose the tag in proximity to the bag with the extended end of the twine adjacent said severed end, and means for thereafter applying a fastener to secure both the severed end and the extended end of the twine to said one edge of the bag, said severing means operating to sever the extended end of the twine adjacent the edge of the bag substantially simultaneously with the fastener applying operation.

15. In apparatus for producing infusion bags, in combination, means for forming a strip of connected filled and closed bag sections, means for severing successive endmost bag sections from the strip, conveying means having a plurality of grippers arranged to receive successive endmost bag sections prior to severance from the strip, and means for attaching a handle comprising a length of twine and a tag to each of successive bags while supported in said grippers, means for withdrawing and ejecting the completely tagged bags from the grippers, and driving means including a manually operated clutch arranged to render inoperative said handle attaching means whereby to permit untagged bags to pass through and be discharged from the machine.

16. The method of attaching a handle comprising a length of twine and a tag to an infusion bag, comprising placing and retaining one end of a length of twine adjacent the bag, fastening a tag to the extended end of the twine, relatively moving the bag and twine to effect winding of the twine about the bag and to dispose the tag in proximity to the bag with the extended end of the twine adjacent said first end thereof, and then fastening both ends of the twine to the bag, with the tagged end thereof detachably fastened to the bag to permit removal thereof and extensions of the handle for use.

17. The method of attaching a handle comprising a length of twine and a tag to an infusion bag of the flat type, comprising placing and retaining one end of a length of twine adjacent an edge of the bag, fastening a tag to the extended end of the twine, winding the twine about the bag to dispose the tag in proximity to the bag with the extended end of the twine adjacent said first end, and then fastening both ends of the twine to the bag with the tagged end detachably fastened to the bag to permit removal thereof and extension of the handle for use.

18. The method of attaching a handle comprising a length of twine and a tag to an infusion bag, comprising placing and retaining one end of a length of twine adjacent the bag, fastening a tag to the extended end of the twine, relatively rotating the bag and twine to effect winding of the twine about the bag and to dispose the tag in proximity to the bag with the extended end of the twine adjacent said first end, and then fastening both ends of the twine to the bag with the tagged end detachably fastened to the bag to permit removal thereof and extension of the handle for use.

19. In apparatus for producing non-tangling infusion bags of the type provided with handles, tagging mechanism for attaching to the bag a handle comprising a length of twine and a tag, said tagging mechanism having provision for detachably securing the tag in proximity to the bag with the portion of the twine attaching the tag to the bag being in the form of a loop encircling the bag.

20. In apparatus for producing non-tangling infusion bags of the type provided with handles, tagging mechanism for attaching to the bag a handle comprising a length of twine and a tag, said tagging mechanism having provision for winding the twine about the bag and detachably securing one end of the twine to the bag with the tag in proximity to the bag.

21. In apparatus for producing non-tangling infusion bags of the type provided with handles, tagging mechanism for attaching to the bag a handle comprising a length of twine and a tag, said tagging mechanism having provision for securing the tag in proximity to the bag, and with the major portion of the twine disposed adjacent to the body of the bag in an encircling loop.

22. In a machine of the character described: a conveyor having a bag gripper arranged to receive and support a bag; means for holding one end of a supply of twine adjacent one side of said bag at a point disposed inwardly from one end of said bag with said twine extending from said point and overlying said one side of said bag; means for relatively moving said twine and bag to wind the extended portion of said twine completely around said bag; means for fixedly securing said one end portion and detachably securing said extended portion of said twine to said bag; and means for severing said extended portion of said twine at a point adjacent said one end of said bag.

23. In a machine of the character described: a conveyor having a bag gripper arranged to receive and support a bag; means for holding one end of a supply of twine adjacent one side of said bag at a point disposed inwardly from one end of said bag with said twine extending from said point and overlying said one side of said bag; means for securing a tag to the extended portion of said twine at a point remote from said one end portion of said twine; means for relatively moving said twine and bag to wind the extended portion of said twine completely around said bag with said tag disposed on said one side of said bag and between said twine and bag; means for fixedly securing said one end portion and detachably securing said extended portion of said twine to said bag; and means for severing said extended portion of said twine at a point adjacent said one end of said bag.

24. The method of attaching a handle to an infusion bag, comprising: holding one end portion of a supply of twine adjacent one side of a bag at a point disposed inwardly from one end of said bag with said twine extending from said point and overlying said one side of said bag; relatively moving said bag and twine to wrap the extended portion of said twine completely around said bag with the extended portion of said twine disposed alongside said one end portion of said twine; fixedly securing said one end portion of said twine to said bag and detachably securing said extended portion of said twine to said bag; and severing the extended portion of said twine at a point adjacent said one end of said bag.

25. The method of attaching a handle to an infusion bag, comprising: holding one end portion of a supply of twine adjacent one side of a bag at a point disposed inwardly from one end of said bag with said twine extending from said point and overlying said one side of said bag; relatively moving said bag and twine to wrap the extended portion of said twine around said bag with an intermediate portion of the twine passing across the opposite side of the bag and with the extended portion of said twine disposed alongside said one end portion of said twine on said one side of said bag; stapling said twine to said bag; and severing the extended portion of said twine at a point adjacent said one end of said bag.

26. The method of attaching a handle to an infusion bag, comprising: holding one end portion of a supply of twine adjacent one side of a bag at a point disposed inwardly from one end of said bag with said twine extending from said point and overlying said one side of said bag; fixedly securing a tag to the extended portion of said twine at a predetermined distance from said one end portion of said twine; rotating said bag through an angle of 360° to wrap said twine around said bag with said tag disposed in engagement with said one side of said bag and with the extended portion of said twine alongside said one end portion of said twine; fixedly securing said one end portion of said twine to said bag and detachably securing said extended portion of said twine to said bag; and severing the extended portion of said twine at a point adjacent said one end of said bag.

27. The method of attaching a handle to an infusion bag, comprising: holding one end portion of a supply of twine adjacent one side of a first bag with said end portion of said twine disposed intermediate the ends of said first bag; extending the twine across one side of a second bag; fixedly securing a tag to the extended portion of said twine at a predetermined distance from said one end portion of said twine; rotating said first bag to wrap said twine completely around said first bag and to dispose said tag in proximity to said one side of said first bag with the extended portion of said twine alongside said one end portion of said twine; fixedly securing said one end portion of said twine to said first bag and detachably securing said extended portion of said twine to said first bag; gripping the extended portion of said twine at a point above said second bag; severing said twine at a point between said first and second bags; and retracting said twine until the newly severed end thereof is disposed adjacent one side of said second bag and intermediate the ends of said second bag.

LEWIS B. EATON.
ROBERT WILLIAM VERGOBBI.

REFERENCES CITED

The following references are of record in the file of this patent:

UNITED STATES PATENTS

| Number | Name | Date |
|---|---|---|
| 2,334,256 | Eaton | Nov. 16, 1943 |
| 2,360,510 | Murray | Oct. 17, 1944 |